(12) United States Patent
Hassanzadeh et al.

(10) Patent No.: US 10,148,685 B2
(45) Date of Patent: *Dec. 4, 2018

(54) EVENT CORRELATION ACROSS HETEROGENEOUS OPERATIONS

(71) Applicant: Accenture Global Services Limited, Dublin (IE)

(72) Inventors: Amin Hassanzadeh, Arlington, VA (US); Shimon Modi, Washington, DC (US); Shaan Mulchandani, Arlington, VA (US); Walid Negm, Reston, VA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,779

(22) Filed: Jul. 17, 2017

(65) Prior Publication Data

US 2017/0318050 A1 Nov. 2, 2017

Related U.S. Application Data

(63) Continuation of application No. 14/841,227, filed on Aug. 31, 2015, now Pat. No. 9,712,554.
(Continued)

(51) Int. Cl.
*G06F 21/00* (2013.01)
*H04L 29/06* (2006.01)
*H04L 29/08* (2006.01)

(52) U.S. Cl.
CPC ...... *H04L 63/1433* (2013.01); *H04L 63/0227* (2013.01); *H04L 63/1408* (2013.01); *H04L 63/1425* (2013.01); *H04L 67/10* (2013.01)

(58) Field of Classification Search
CPC ..... H04L 47/12; H04L 47/193; H04L 47/283; H04L 12/5601; H04L 12/66;
(Continued)

(56) References Cited

U.S. PATENT DOCUMENTS 7,376,969 B1 5/2008 Njemanze et al.
8,176,527 B1 5/2012 Njemanze et al.
(Continued)

OTHER PUBLICATIONS

Briesemeister et al., "Detection, Correlation, and Visualization of Attacks Against Critical Infrastructure Systems," Eighth Annual Conference on Privacy, Security and Trust, Ottawa, Ontario, Canada, Aug. 2010, 8 pages.
(Continued)

*Primary Examiner* — Ghazal B Shehni
(74) *Attorney, Agent, or Firm* — Fish & Richardson P.C.

(57) ABSTRACT

Methods, systems, and apparatus, including computer programs encoded on computer storage media, for determining a network security threat response. A data structure that represents communication events between computing devices of two or more network domains is received. The data structure is analyzed and a threat scenario that is based on a chain of communication events that indicates a potential attack path is determined. The chain of communication events include a sequence of communication events between computing devices proceeding from an originating computing device to a destination computing device, wherein the originating computing device and the destination computing device exist on different network domains. Attack pattern data, for the threat scenario and from a threat intelligence data source, that is associated with communications between computing devices that occurred during one or more prior attacks is received. Based on the threat scenario and the attack pattern data, one or more courses of action for
(Continued)

responding to the threat scenario is determined, and information associated with the one or more courses of action is provided.

22 Claims, 13 Drawing Sheets

Related U.S. Application Data

(60) Provisional application No. 62/145,248, filed on Apr. 9, 2015.

(58) Field of Classification Search
CPC ... H04L 2012/568; H04L 45/38; H04L 45/60; H04L 47/2433; H04L 47/20; H04L 47/215
See application file for complete search history.

(56) References Cited

U.S. PATENT DOCUMENTS

| | | | |
|---|---|---|---|
| 8,307,444 B1 | 11/2012 | Mayer et al. | |
| 9,124,636 B1 | 9/2015 | Rathor | |
| 2006/0129810 A1* | 6/2006 | Jeong | H04L 63/1433 713/166 |
| 2006/0212931 A1 | 9/2006 | Shull et al. | |
| 2007/0209074 A1 | 9/2007 | Coffman | |
| 2009/0113550 A1 | 4/2009 | Costa et al. | |
| 2011/0252032 A1 | 10/2011 | Fitzgerald et al. | |
| 2012/0224057 A1 | 9/2012 | Gill et al. | |
| 2013/0067067 A1 | 3/2013 | Miri et al. | |
| 2014/0007241 A1 | 1/2014 | Gula et al. | |
| 2014/0096251 A1 | 4/2014 | Doctor et al. | |
| 2014/0337500 A1* | 11/2014 | Lee | H04L 41/12 709/223 |
| 2014/0380488 A1 | 12/2014 | Datta Ray et al. | |
| 2015/0058993 A1 | 2/2015 | Choi et al. | |
| 2015/0074806 A1 | 3/2015 | Roundy et al. | |

OTHER PUBLICATIONS

Caselli et al., "Sequence-aware Intrusion Detection in Industrial Control Systems," CPSS'15, Apr. 2015, pp. 13-24.
Friedberg et al., "Combating advanced persistent threats: From network event correlation to incident detection," Computers and Security, 2015, 48:35-57.
Gong et al. "Characterizing Intrusion Tolerant Systems Using a State Transition Model," Darpa Discex II Conference, 2001, 10 pages.
Hutchins et al., "Intelligence-Driven Computer Network Defense Informed by Analysis of Adversary Campaigns and Intrusion Kill Chains," Proceedings of the 6th International Conference on Information Warfare and Security (ICIW '11); Mar. 2011, 14 pages.
Mathew et al., "Understanding Multistage Attacks by AttackTrack Based Visualization of Heterogeneous Event Streams," VizSEC 06, Nov. 2006, 5 pages.
Skopik and Fiedler, "Intrusion Detection in Distributed Systems using Fingerprinting and Massive Event Correlation," in Matthias Horbach, ed., 'GI-Jahrestagung,' 2013, 15 pages.
Valeur et al., "A Comprehensive Approach to Intrusion Detection Alert Correlation," IEEE Transactions on Dependable and Secure Computing, 2004, 1(3):1-23.
Spadaro, A., "Event correlation for detecting advanced multi-stage cyber-attacks," M.Sc. Thesis, Delft University of Technology, 2013, 151 pages.
Valeur, F., "Real-Time Intrusion Detection Alert Correlation", Doctoral Dissertation, University of California, Santa Barbara, 2006, 199 pages.
Australia Office Action in Application No. 2016202184, dated Apr. 29, 2016, 5 pages.
European Search Report in Application No. 16164614.6, dated Jun. 23, 2016, 4 pages.
European Search Report in Application No. 16164616.1, dated Jun. 13, 2016, 4 pages.
European Office Action in Application No. 16 164 616.1, dated Jun. 28, 2016, 6 pages.
European Office Action in Application No. 16164614.6, dated Jul. 12, 2016, 5 pages.
Australian Office Action in Application No. 2016202191, dated Jul. 8, 2016, 5 pages.
Mehta, V. et al. "Ranking attack graphs," International Workshop on Recent Advances in Intrusion Detection, (pp. 127-144). Sep. 20, 2006. (online) retrieved from the internet on Jul. 5, 2016 http://www.cs.cmu.edu/~emc/papers/Conference%20Papers/Ranking%20Attack%20Graphs.pdf.
Wang, L. et al. "Measuring the overall security of network configurations using attack graphs," IFIP Annual Conference on Data and Applications Security and Privacy (pp. 98-112), Jul. 8, 2007. (online) retrieved from the internet on Jul. 7, 2016. http://craigchamberlain.com/library/metrics/Measuring%20Overall%20Security%20With%20Attack%20Graphs.pdf.
Noel S. et al. "Advanced vulnerability analysis and intrusion detection through predictive attack graphs," Critical Issues in C4I, Armed Forces Communications and Electronics Association (AFCEA) Solutions Series. International Journal of Command and Control. May 2009. (online) retrieved from the internet on Jul. 7, 2016. http://citeseerx.ist.psu.edu/viewdoc/download?doi=10.1.1.704.4878&rep=rep1&type=pdf.
Homer, J. et al. "A sound and practical approach to quantifying security risk in enterprise networks," Kansas State University Technical Report, Aug. 1, 2009. (online) retrieved from the internet on Jul. 7, 2016. http://www.cse.usf.edu/~xou/publications/tr_homer_0809.pdf.
Australian Office Action for Application No. 2016202191, dated Jul. 7, 2017, 10 pages.
Canadian Office Action for Application No. 2,926,603, dated Dec. 19, 2017, 3 pages.
Canadian Office Action for Application No. 2,926,579, dated Dec. 19, 2017, 5 pages.

* cited by examiner

EVENT CORRELATION ACROSS HETEROGENEOUS OPERATIONS

CROSS-REFERENCE TO RELATED APPLICATIONS

This application is a continuation (and claims the benefit of priority under 35 USC 120) of U.S. application Ser. No. 14/841,227, filed Aug. 31, 2015, which claims the benefit of U.S. Provisional Patent Application No. 62/145,248, filed Apr. 9, 2015, and titled "EVENT CORRELATION ACROSS HETEROGENEOUS OPERATIONS," which are hereby incorporated by reference in their entirety.

BACKGROUND

The present disclosure relates to security and network operations.

SUMMARY

In general, one innovative aspect of the subject matter described in this specification can be embodied in methods for transforming representations of network activity data, including receiving a data structure that represents communication events between computing devices of one or more networks, the data structure being a directed graph stored in a graph database, analyzing the data structure and determining a set of potential attack paths represented in the data structure, assigning a score to each potential attack path in the set of potential attack paths, removing potential attack paths from the set of potential attack paths that have scores that do not meet a predetermined threshold, ranking potential attack paths that remain in the set of potential attack paths, based on each score assigned to each potential attack path, and providing the data structure that includes a ranked set of potential attack paths.

Other embodiments of this aspect include corresponding computer methods, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments may each optionally include one or more of the following features. For instance, the computing devices of the one or more networks can be represented by nodes of the directed graph, and the communication events can be represented by directed edges between the nodes of the directed graph. Determining the set of potential attack paths represented in the data structure can include traversing the directed graph based on timestamp information associated with the directed edges between the nodes to determine a plurality of node sequences, each node sequence proceeding from an originating node to a destination node. Determining the set of potential attack paths represented in the data structure can include determining all possible node sequences of two or more linked nodes within the data structure. Analyzing the data structure can include receiving information provided by a rule or pattern-based threat intelligence data source. Analyzing the data structure can include determining a meshedness coefficient for the data structure that indicates whether one or more potential attack paths represented in the data structure are looped. Determining the set of potential attack paths represented in the data structure can include converting looped potential attack paths to non-looped potential attack paths. Assigning the score to each potential attack path in the set of potential attack paths can include determining, for each potential attack path, two or more component scores including two or more of a spatial component score, a temporal component score, and an importance component score. The score for the potential attack path can be an aggregation of the two or more component scores. The spatial component score can represent a distance between computing devices within the one or more networks. The spatial component score can represent a number of logical system boundaries crossed by the potential attack path. The temporal component score can represent a function of the rate at which communication events associated with the attack path occur. The importance component score can represent an importance of one or more computing devices associated with the potential attack path. Determining the importance component score can include receiving information related to the one or more computing devices associated with the potential attack path from a configuration management system. The importance component score can represent an importance of one or more communication events associated with the potential attack path. Determining the importance component score can include receiving information related to the one or more communication events associated with the potential attack path from a network security sensor.

Particular embodiments of the subject matter described in this specification may be implemented so as to realize one or more of the following advantages. A single vantage point and a standardized data exchange format may be provided for analyzing event/alert log data from information technology (IT) and operational technology (OT) networks. Currently available security sensors (e.g., intrusion detection systems (IDS), intrusion prevention systems (IPS), and other suitable security sensors) may be leveraged, resulting in architectural independence, flexibility, and compatibility with legacy infrastructures/networks. False alarm rates may be reduced in an event detection process. Multi-step, multi-domain threat scenarios may be detected and/or constructed. Complex scenarios may be visually represented, and network status may be shown at each step of an attack. Threat intelligence platforms/services may be integrated to further enrich and contextualize information and constructed scenarios.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems, methods, and computer programs for performing event correlation across heterogeneous operations. For example, an industrial internet may be used to manage and administer industrial control systems (ICS), which may communicate over an enterprise network and may include information technology (IT) and operational technology (OT) domains. Some threat scenarios may include multi-step, multi-domain attacks, and may include attacks that originate in one domain, and proceed to another domain. By filtering, aggregating, and correlating data from event/alert logs from each domain (e.g., IT and OT domains), for example, complex attack patterns may be detected. Information about the attack patterns (e.g., visualization data) may be reported to a security analyst, and may be used for implementing appropriate courses of action.

Figure 1:
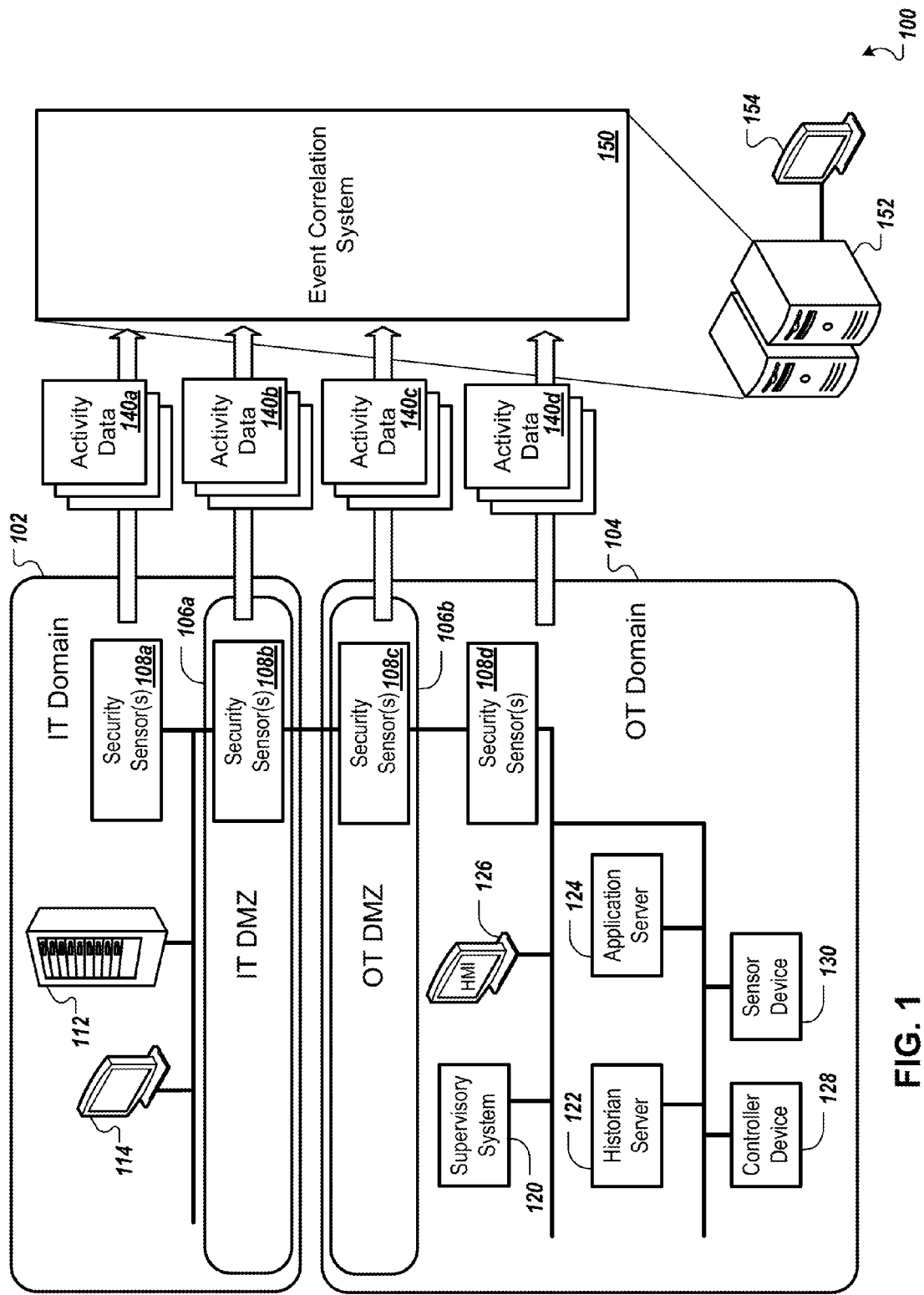
FIGS. 1-3 depict example systems that can execute implementations of the present disclosure.

FIG. 1 depicts an example system 100 that can execute implementations of the present disclosure. In the present example, the system 100 (e.g., an industrial control system) includes multiple network domains, including an information technology (IT) network domain 102 (e.g., including an enterprise network) and an operational technology (OT) network domain 104. The information technology network domain 102 and the operational technology network domain 104 can be in communication, for example, over a demilitarized zone (DMZ) 106a of the information technology network domain 102 and a demilitarized zone (DMZ) 106b of the operational technology network domain 104. Each of the network domains 102 and 104, for example, may include local and wide area networks (LAN/WAN) and wireless networks, and can be used to integrate various computing devices, such as servers, mainframes, desktops, laptops, tablets, smartphones, and industrial control devices and sensors, that may run on multiple different operating systems and may employ multiple different communication protocols.

The information technology network domain 102 can include various computing devices (e.g., computing server 112), input/output devices (e.g., interface device 114), and/or subsystems. The computing server 112, for example, can include one or more processors configured to execute instructions stored by computer-readable media for performing various operations, such as input/output, communication, data processing, and/or data maintenance. To interact with the computing server, for example, a user can employ the interface device 114 (e.g., including one or more presentation components, such as a display, and one or more input components such as a keyboard, mouse, and/or touchpad).

The operational technology network domain 104 can include various computing devices, input/output devices, and/or subsystems. In the present example, the operational technology network domain 104 includes a supervisory system 120, a historian server 122, an application server 124, one or more human-machine interface (HMI) devices (e.g., HMI device 126), and one or more controller devices (e.g., controller device 128) and sensor devices (e.g., sensor device 130). The supervisory system 120, for example, can coordinate one or more low-level controls and/or low-level sensors. In the present example, the supervisory system 120 can provide data to and receive data from the controller device 128 and the sensor device 130. The historian server 122, for example, can store, maintain, and provide information related to activities performed by each controller device and sensor data provided by each sensor device in the operational technology network domain 104. The application server 124, for example, can host applications that may operate within the operational technology network domain 104.

In some implementations, the system 100 may include one or more security sensors (e.g., security sensors 108a, 108b, 108c, and 108d). In general, security sensors included in the system 100 may include network based (NIDS) and host based (HIDS) intrusion detection systems, intrusion prevention systems (IPS), anti-virus systems, firewalls, and other detection/logging services (e.g., web server logs, database logs, etc.) which can monitor communications activity to and from computing devices included in the industrial technology (IT) network domain 102, the IT DMZ 106a, the operational technology (OT) network domain 104, and/or the OT DMZ 106b, and can monitor system activity associated with the devices. Data associated with potentially malicious activity may be detected (and optionally, recorded) by the security sensors 108a, 108b, 108c, and 108d (e.g., as event/alert data, log files, etc.), and/or other detection/logging devices included in the system 100, and/or may be provided to other components of the system 100. For example, activity data 140a, 140b, 140c, and 140d (e.g., detected by the corresponding security sensors 108a, 108b, 108c, and 108d) may be provided to an event correlation system 150. Such activity data may also be provided to an event correlation system 150 by a Security Information and Event Management (SIEM) system. The activity data 140a, for example, may include enterprise data from the information technology network domain 102, provided by host-based monitoring systems (e.g., intrusion detection/prevention systems, web server logging services, system logs, etc.) and/or network-based monitoring systems (e.g., intrusion detection/prevention systems, firewalls, routers, etc.). The activity data 140b, for example, may include data associated with communication over the IT DMZ 106a. The activity data 140c, for example, may include data associated with communication over the OT DMZ 106b. The activity data 140d, for example, may include supervisory data, control layer data, and/or sensor and controller device data from the operational technology network domain 104, provided by host-based monitoring systems and/or network-based monitoring systems.

In the present example, each of the activity data 140a, 140b, 140c, and 140d may include event and/or alert data. In general, events are atomic pieces of data associated with communications and system activity, whereas alerts may be triggered in response to an event or a sequence of events. Data provided by the security sensors 108a, 108b, 108c, and 108d, for example, may include alert data. Data provided by a host (e.g., the computing server 112), controller device (e.g., the controller device 128) or sensor device (e.g., the sensor device 130), or data included in log files, for example, may include event data.

The event correlation system 150, for example, can receive the activity data 140a, 140b, 140c, and 140d from multiple domains (e.g., the information technology (IT) network domain 102, the IT DMZ 106a, the operational technology (OT) network domain 104, and the OT DMZ 106b), and can standardize, filter, aggregate, and correlate the data to detect anomalies and potentially malicious activity associated with multi-stage, multi-domain attacks. In the present example, the event correlation system 150 can include various computing devices (e.g., computing server 152), input/output devices (e.g., interface device 154), and/or subsystems. The computing server 152, for example, can include one or more processors configured to execute instructions stored by computer-readable media for performing various operations, such as input/output, communication, data processing, and/or data maintenance. To interact with the computing server, for example, a user can employ the interface device 154 (e.g., including one or more presentation components, such as a display, and one or more input components such as a keyboard, mouse, and/or touchpad).

In some implementations, output may be provided by the event correlation system 150 to another system (e.g., a security information and event management (SIEM) system) and/or to a system operator as reporting/visualization data. Based on the system output, for example, appropriate courses of action may be employed to counter ongoing and/or future attacks. In the present example, the information technology (IT) network domain 102, the IT DMZ 106a, the operational technology (OT) network domain 104, and the OT DMZ 106b each has different characteristics (e.g., architecture, resources, protocols, and standards), and each domain may be susceptible to different security threats. Occasionally, correlations may not be detected among events/alerts within a single domain, (and if correlations are detected, an extent of an associated compromise may not be entirely known), but correlations may be detected among events/alerts across multiple domains. By correlating data from multiple domains, for example, complex attacks (e.g., multi-stage, multi-domain attacks executed over time) may be detected, and a single vantage point may be provided to security technicians.

Figure 2:
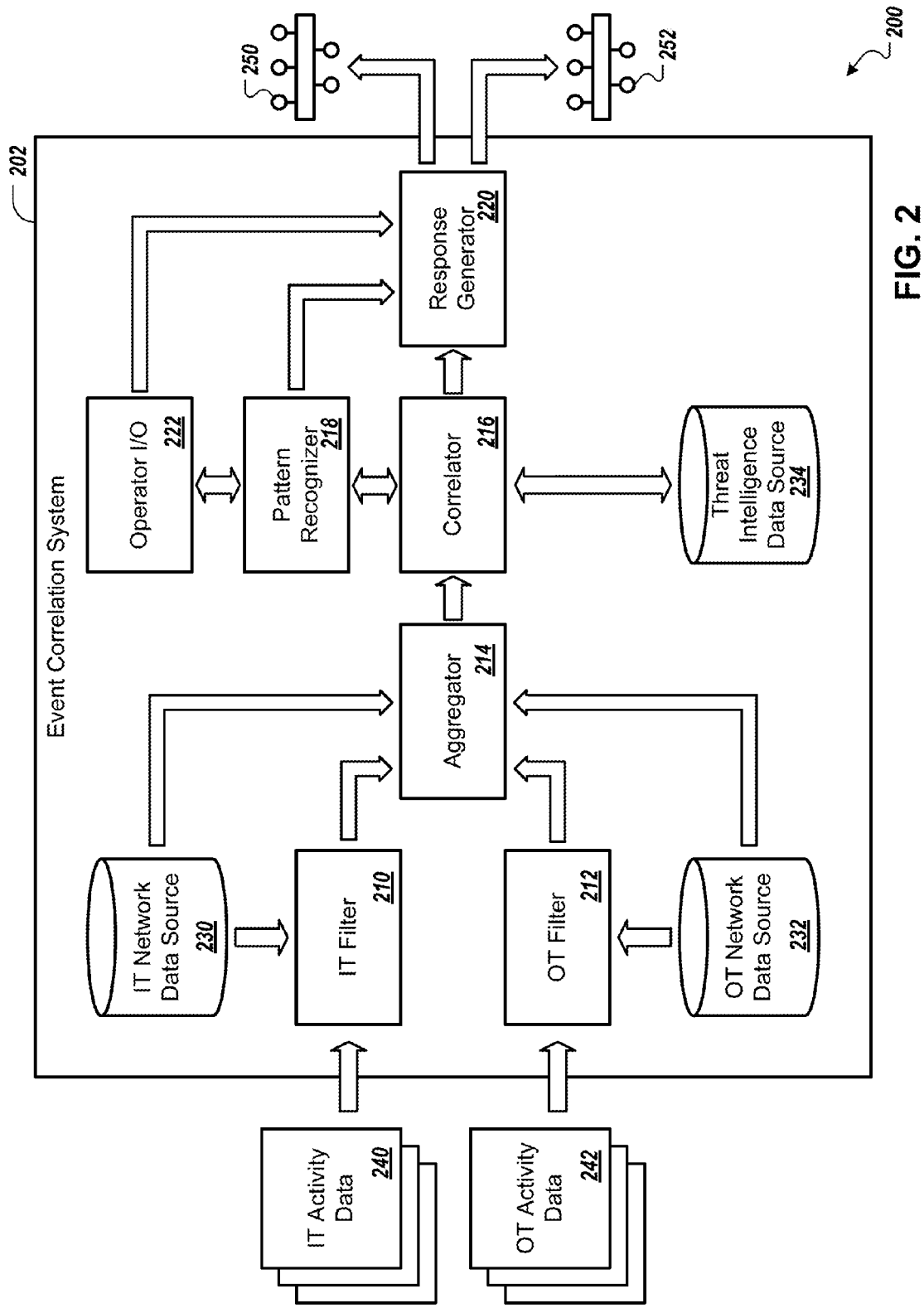

FIG. 2 depicts an example system 200 that can execute implementations of the present disclosure. In the present example, the system 200 includes an event correlation system 202 (e.g., similar to the event correlation system 150, shown in FIG. 1). The event correlation system 202, for example, can include various hardware and/or software-based components (e.g., software modules, objects, engines, libraries, etc.) including an information technology (IT) activity data filter 210, an operational technology (OT) activity data filter 212, an aggregator 214, a correlator 216, a pattern recognizer 218, a response generator 220, and an operator input/output (I/O) component 222. Various data sources (e.g., databases, file systems, etc.) may maintain data used by the system 200 and its components. In the present example, the system 200 can receive information from an information technology (IT) network data source 230, an operational technology (OT) network data source 232, and a threat intelligence data source 234. Activity data associated with a demilitarized zone (DMZ) or peripheral network, for example, may be provided by the information technology network data source 230 and/or the operational technology network data source 232. In general, the system 200 and its various components (e.g., components 210, 212, 214, 216, 218, 220, and 222) can perform functions for processing event/alert data received from various sources, aggregating the data, correlating the data, detecting patterns in the data, and providing relevant information to system operators and/or other systems.

In the present example, the event correlation system 202 can receive information technology (IT) activity data 240 that includes event/alert data from an information technology network (e.g., the information technology (IT) network domain 102, and optionally the IT DMZ 106a, shown in FIG. 1), and can receive operational technology (OT) activity data 242 that includes event/alert data from an operational technology network (e.g., the operational technology (OT) network domain 104, and optionally the OT DMZ 106b, shown in FIG. 1). In some implementations, the information technology activity data 240 and/or the operational technology activity data 242 may include log data provided by one or more security sensors (e.g., the security sensors 108a, 108b, 108c, and 108d, shown in FIG. 1). Upon receiving the information technology activity data 240, for example, the event correlation system 202 can use the information technology activity data filter 210 to filter out irrelevant (or "false") events/alerts, based on data provided by the information technology network data source 230. Similarly, upon receiving the operational technology activity data 242, for example, the event correlation system 202 can use the operational technology activity data filter 212 to filter out irrelevant (or "false") events/alerts, based on data provided by the operational technology network data source 232. Operation of the information technology activity data filter 210 and the operational technology activity data filter 212 is discussed in further detail below in association with FIG. 3.

After filtering the information technology activity data 240 and the operational technology activity data 242, for example, filtered event/alert data can be provided by the information technology activity data filter 210 and the operational technology activity data filter 212 to the aggregator 214. In general, the event correlation system 202 can use the aggregator 214 to remove duplicate and/or redundant events/alerts, to combine events/alerts related to the same attack, and to combine events/alerts relating to different attacks but possessing similar characteristics, thus reducing the number of events/alerts under consideration. In some implementations, the aggregator 214 may reference data provided by the information technology network data source 230 and/or the operational technology network data source 232 when performing aggregation operations. Operation of the aggregator 214 is discussed in further detail below in association with FIG. 4A.

After aggregating the event/alert data, for example, aggregated data can be provided by the aggregator 214 to the correlator 216. In general, the event correlation system 202 can use the correlator 216 to generate a chain of events/alerts that may correspond to a threat scenario, and the event correlation system 202 can use the pattern recognizer 218 (e.g., based on data provide by the threat intelligence data source 234) to identify attack patterns associated with the threat scenario, and to further describe and/or enrich threat scenario information. Based on threat scenarios identified by the correlator 216 and attack patterns identified by the pattern recognizer 218, and optionally based on operator input received by the operator input/output component 222, for example, the response generator 220 can provide appropriate courses of action for responding to threats to the information technology network 250 and the operational technology network 252. Operation of the correlator 216 and the pattern recognizer 218 is discussed in further detail below in association with FIG. 5A.

Figure 3:
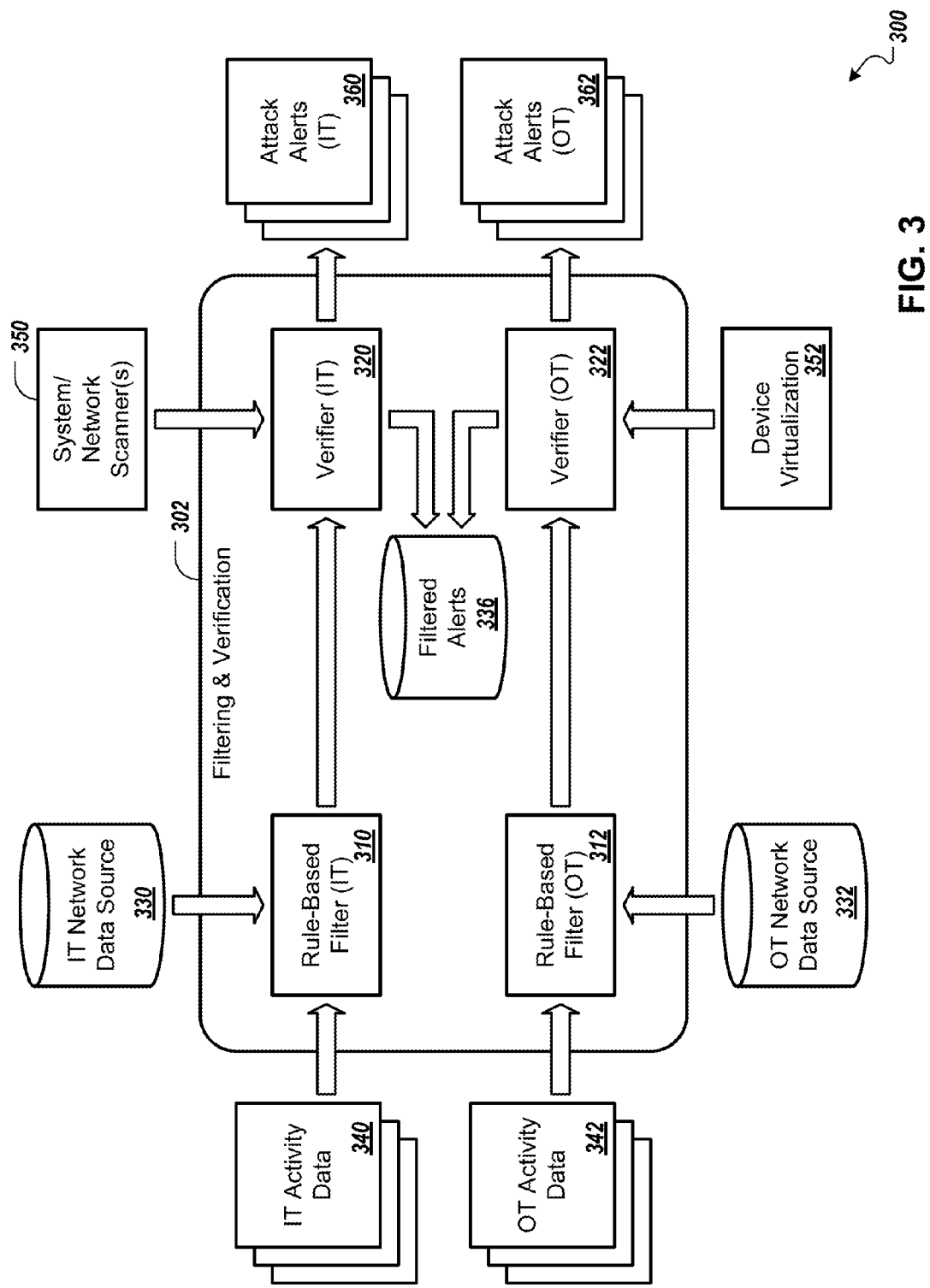

FIG. 3 depicts an example system 300 that can execute implementations of the present disclosure. In the present example, the system 300 includes a filtering and verification system 302 (e.g., corresponding to the information technology activity data filter 210 and the operational technology activity data filter 212, shown in FIG. 2). The filtering and verification system 302, for example, can include various hardware and/or software-based components (e.g., software modules, objects, engines, libraries, etc.) including a rule-based filter 310 for information technology (IT) activity data, a rule-based filter 312 for operational technology (OT) activity data, an optional verifier 320 for information technology (IT) activity data, and an optional verifier 322 for operational technology (OT) activity data. Various data sources (e.g., databases, file systems, etc.) may maintain data used by the system 300 and its components. In the present example, the system 300 includes an information technology (IT) network data source 330 (e.g., including configuration management information associated with devices in the information technology (IT) network domain 102, shown in FIG. 1), an operational technology (OT) network data source 332 (e.g., including configuration management information associated with devices in the operational technology (OT) network domain 104, shown in FIG. 1), and a filtered alerts data source 336. In general, the system 300 and its various components (e.g., components 310, 312, 320, and 322) can perform functions for processing event/alert data received from various different sources. By removing or filtering out irrelevant event/alert data (i.e., false positives and/or noise), for example, the accuracy of correlation engines may be increased.

In the present example, the filtering and verification system 302 can receive information technology (IT) activity data 340 that includes event/alert data from an information technology network, and optionally, a corresponding DMZ (e.g., the information technology (IT) network domain 102 and the IT DMZ 106a, shown in FIG. 1), and can receive operational technology (OT) activity data 342 that includes event/alert data from an operational technology network, and optionally, a corresponding DMZ (e.g., the operational technology (OT) network domain 104 and the DMZ 106b, shown in FIG. 1). In some implementations, the information technology activity data 340 and/or the operational technology activity data 342 may include log data provided by one or more security sensors (e.g., security sensors 108a, 108b, 108c, and 108d, shown in FIG. 1). For example, activity data received from multiple sources (e.g., multiple security sensors, intrusion detection systems, and/or other security tools) may be heterogeneous in regard to language, protocols, and standards. Such activity data may be heterogeneous, for example, not only because of different security tools in a single domain (which may be resolved through the use of alert/event standardization/normalization tools that convert data to a standard format), but because of different protocol standards which may be employed in multiple different domains by the same security tool. As another example, a standard format may be used for communicating activity data. Upon receiving the information technology activity data 340, for example, the filtering and verification system 302 can use the rule-based filter 310 for information technology activity data to filter out irrelevant (or "false") events/alerts, based on data provided by the information technology network data source 330 (e.g., similar to the information technology network data source 230, shown in FIG. 2), and in conjunction with additional rules that may be defined by system administrators. Similarly, upon receiving the operational technology activity data 342, for example, the filtering and verification system 302 can use the rule-based filter 312 for operational technology activity data to filter out irrelevant (or "false") events/alerts, based on data provided by the operational technology network database 332 (e.g., similar to the operational technology network data source 232, shown in FIG. 2), and in conjunction with additional rules that may be defined by system administrators.

In general, rule-based filtering performed by each of the rule-based filters 310 and 312 can remove irrelevant events/alerts (e.g., events/alerts that are not determined to be associated with a potential attack) based on a target's profile and/or characteristics of the events/alerts. Rule-based filtering, for example, may apply to defined rules that discard particular events/alerts (e.g., false positives) based on how frequently events/alerts with certain characteristics occur, and their relative rate of change with regard to occurrence. Profile data for potential targets (e.g., computing devices) in the information technology network domain 102 (shown in FIG. 1) can be maintained by the information technology network data source 330, and profile data for potential targets (e.g., computing devices, controllers, and sensors) in the operational technology network domain 104 (shown in FIG. 1) can be maintained by the operational technology network data source 332. For each received event/alert, for example, an appropriate rule-based filter may reference profile data from an appropriate network data source for a target that corresponds to the event/alert (e.g., based on device address), and can determine whether the received event/alert indicates a potential attack. For example, a network-based intrusion detection system may not have specific information about an attacker or about a target, but may generate an alert based on the contents of a communications packet—that is, the alert may be generated if the packet includes an exploit directed to a known vulnerability. However, the generated alert in the present example may or may not indicate a successful attack on the target. For example, if an attack relies on certain system attributes (e.g., a type of operating system), but the system has different attributes (e.g., a different operating system) that are not affected by an attempted attack, the attack is rendered unsuccessful. As another example, if a communications packet is directed to a computing device that does not exist on a network, the network drops the communications packet, rendering the packet ineffective and the attack unsuccessful. By filtering events/alerts associated with attack attempts that are likely to be unsuccessful, reconnaissance attempts (intentional or unintentional), and/or internal activity known to be benign, for example, the number of events/alerts under consideration may be reduced, thus reducing the amount of processing in subsequent stages.

In some implementations, profile data and/or statuses of potential targets (e.g., computing devices) may be dynamically determined when filtering received events/alerts. For example, after performing rule-based filtering on the information technology activity data 340, the filtering and verification system 302 can optionally use the verifier 320 to dynamically verify profile data for a target on the information technology network domain 102 (shown in FIG. 1), and the filtering and verification system 302 can optionally use the verifier 322 to dynamically verify profile data for a target on the operational technology network domain 104 (shown in FIG. 1). For each received event/alert that has not been previously filtered, for example, an appropriate verifier can determine whether dynamically retrieved information regarding a target corresponding to the event/alert (e.g., based on device address) indicates that the event/alert is associated with actual malicious activity. For example, for an unfiltered event/alert corresponding to a target on the information technology network domain 102, the verifier 320 can communicate with a system/network scanner 350 (e.g., with access to configuration management information) to receive current information about the target. In the present example, a communications packet may be directed to an open port on the target, and the rule-based filter 310 may not filter the corresponding alert. However, based on information provided by the system/network scanner 350, the verifier 320 may determine that the target has been patched to counter an attack associated with the alert, for example, rendering the communications packet ineffective and the attack unsuccessful. In the present example, the alert may be filtered out and/or labeled as a potentially unsuccessful attack. As another example, for an unfiltered event/alert corresponding to a target on the operational technology network domain 104, the verifier 322 can communicate with a device virtualization component 352 to receive current information about the target. In the present example, a communications packet may be directed to changing a setting (e.g., a temperature setting, an on/off setting, a power level, a position, etc.) on the target (e.g., a controller device). The device virtualization component 352, for example, can query the target (or one or more sensors associated with the target) for its status to determine an effect of the communications packet. A negative effect, for example, may indicate a potentially successful attack, whereas a neutral effect or lack of an effect may indicate a potentially unsuccessful attack.

After performing rule-based filtering and verification, for example, the filtering and verification system 302 can record filtered alert data associated with potentially unsuccessful attacks and/or false positives (e.g., in the filtered alerts data source 336), and can provide data associated with potential attacks for further processing. For example, the alerts 360 may be indicative of potential attacks on an information technology network (e.g., the information technology network domain 102, shown in FIG. 1) and the alerts 362 may be indicative of potential attacks on an operational technology network (e.g., the operational technology network domain 104, shown in FIG. 1). Data maintained by the filtered alerts data source 336, for example, may be used for generating future security policies, as is discussed in further detail below in association with FIG. 5A.

Figure 4A:
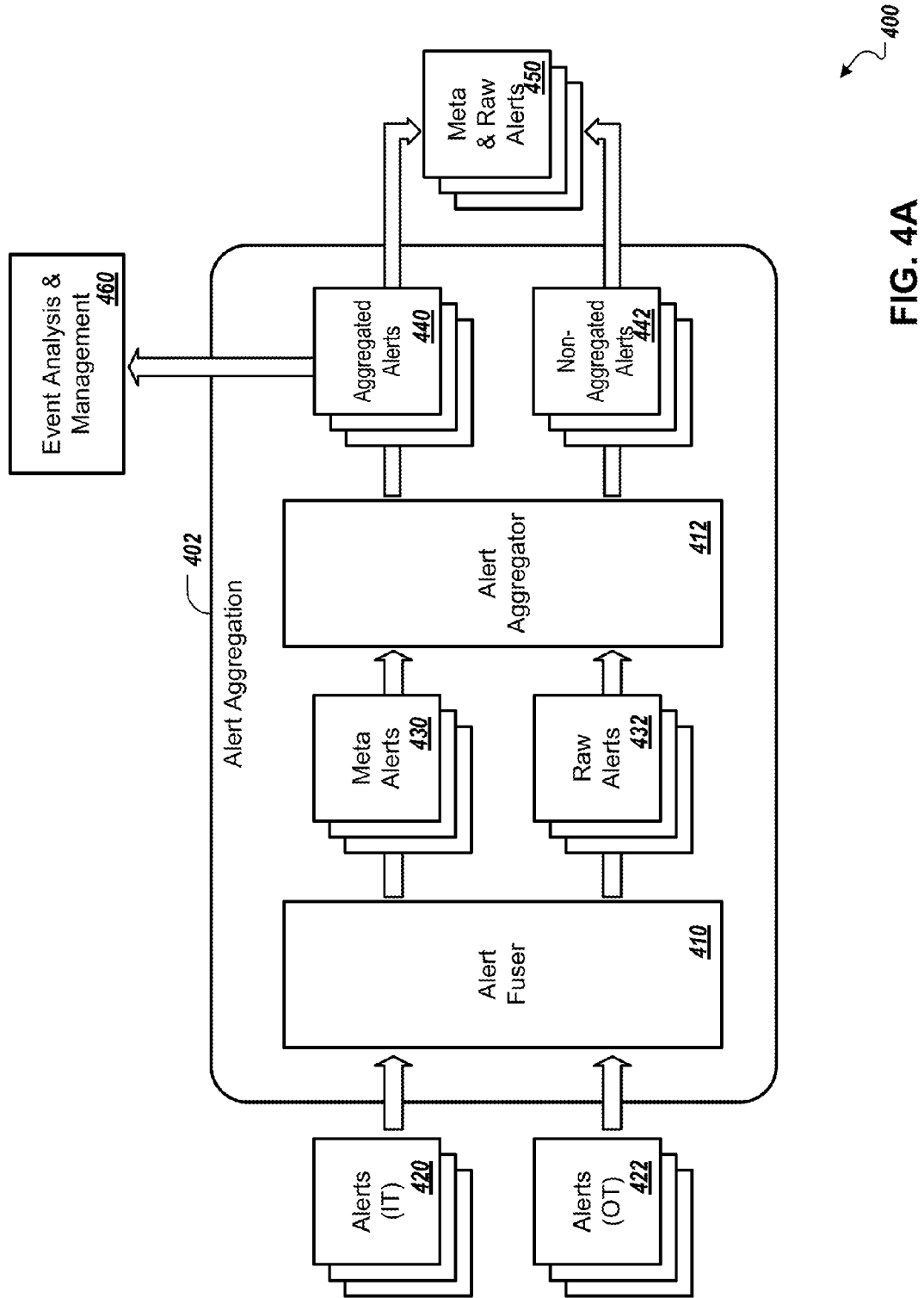
FIG. 4A depicts an example system that can execute implementations of the present disclosure.

FIG. 4A depicts an example system 400 that can execute implementations of the present disclosure. In the present example, the system 400 includes an alert aggregation system 402 (e.g., corresponding to the aggregator 214, shown in FIG. 2). The alert aggregation system 402, for example, can include various hardware and/or software-based components (e.g., software modules, objections, engines, libraries, etc.) including an alert fuser 410 and an alert aggregator 412. In general, the system 400 and its various components (e.g., components 410 and 412) can perform functions for processing and aggregating event/alert data received from various different sources. By aggregating event/alert data, for example, data redundancy can be decreased, and the aggregated event/alert data may be further processed to identify trends and correlations in the data.

In the present example, the aggregation system 402 can receive alert data 420 corresponding to potential attacks on an information technology network (e.g., the information technology network domain 102, shown in FIG. 1) and alert data 422 corresponding to potential attacks on an operational technology network (e.g., the operational technology network domain 104, shown in FIG. 1). Upon receiving the alert data 420 and the alert data 422, for example, the aggregation system 402 can use the fuser 410 to combine similar alerts, which may have been generated by different intrusion detection systems, security tools and/or sensors. For example, if multiple intrusion detection systems are included in the system 100, a malicious packet may be detected by each of the intrusion detection systems, and each of the systems may generate a similar alert in response to detecting the packet. In the present example, each of the similar alerts may include similar data, yet may have slightly different timestamps (e.g., due to network traffic speeds). If the fuser 410 determines that multiple alerts are related (e.g., the alerts were generated in response to the same packet or event based on having similar data and having timestamps within a threshold similarity value), for example, the multiple alerts may be combined into a meta-alert. The fuser 410 can provide meta-alerts 430 and raw alerts 432 (i.e., uncombined alerts) to the alert aggregator 412.

Upon receiving the meta-alerts 430 and raw alerts 432 from the alert fuser 410, for example, the alert aggregator 412 can aggregate the sets of alerts 430 and 432, based on data similarities. In general, alert aggregation may include combining alerts that have similar characteristics, which may indicate launch from and/or targeting of one or more computing devices. For example, an attack may include the scanning of particular computing devices included in an information technology network and computing devices included in an operational technology network, by multiple attackers. In the present example, alerts from the information technology network and alerts from the operational technology network may be aggregated to reflect that the alerts are associated with the same type of attack.

In some implementations, each of the sets of alerts 430 and 432 may have similar data formats (e.g., an intrusion detection message exchange format (IDMEF)), and may include data fields for source address, destination address, port number, timestamp, priority, and attack description. If the alert aggregator 412 determines that two or more of the meta-alerts 430 and/or the raw alerts 432 are similar based on criteria that pertains to data included in each alert (e.g., two or more alerts have the same destination address (and optionally, port number) and have timestamps within a threshold similarity value, two or more alerts have the same source address and have timestamps within a threshold similarity value, two or more alerts are targeted to similar services, or another suitable criteria based on similarity of alert attributes), for example, the alert aggregator 412 may aggregate the alerts. While the description above with regard to two or more of the meta-alerts 430 or raw alerts 432 being similar based on criteria that pertains to data included in each alert (and then being aggregated), it should be understood that the alert aggregator 412 may determine that a large or very large number of alerts are related (e.g. hundreds, thousands, or more alerts) and aggregate those alerts into a single record or data structure that facilitates efficient processing of a large volume of alert data. The alert aggregation system 402 can provide aggregated alerts 440 and non-aggregated alerts 442 as a combined set of meta and raw alerts 450 for further processing. The alert aggregation system 402 can also generate and store (e.g., in a graph database) a data structure that represents both aggregated alerts and a relationship between different aggregated alerts, for example, based on a source and destination address in the aggregated alert. Once generated and stored, the data structure (described in greater detail below) can be further processed by the system, such as event correlation system 150 and system 500. In some implementations, the aggregated alerts 440 can be provided by the alert aggregation system 402 to an event analysis and management system 460 for further analysis.

Figure 4B:
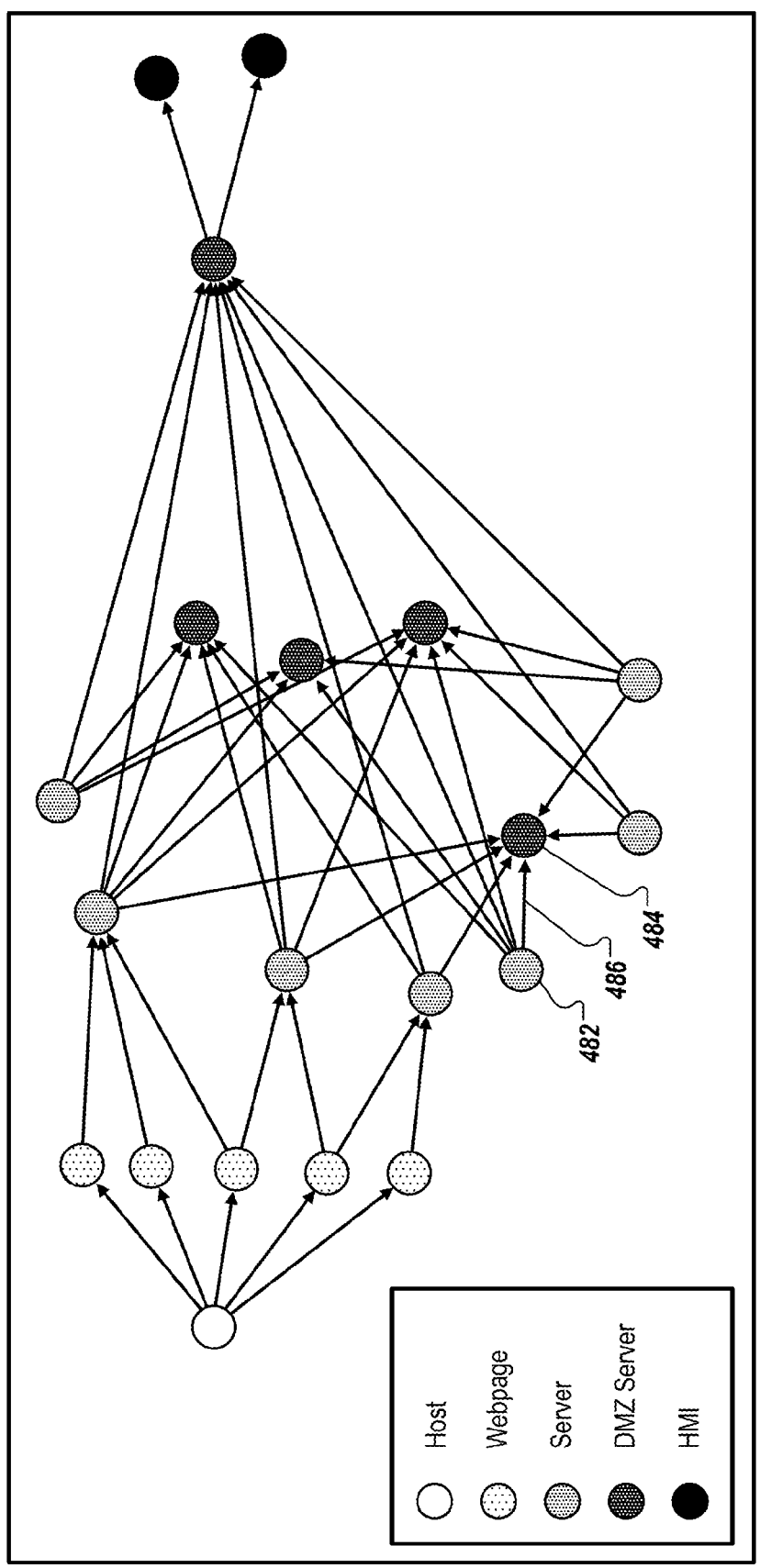
FIG. 4B depicts an example data structure that can be used by implementations of the present disclosure.

FIG. 4B depicts an example data structure 480 that can be used by implementations of the present disclosure once it is generated and stored by the alert aggregation system 402. In some implementations, the data structure 480 (e.g., a directed graph) can be generated and used to represent the meta and raw alerts 450 provided by the alert aggregation system 402. Nodes (e.g., node 482, node 484) in the data structure 480 can represent entities referenced in the meta and raw alerts 450, such as computing devices/assets (e.g., devices/assets within the information technology (IT) network domain 102, the IT DMZ 106a, the operational technology (OT) network domain 104, and the OT DMZ 106b), internet protocol (IP) addresses, computer network port numbers, and web pages or other resources provided by a web server. Edges (e.g., edge 486) in the data structure 480 can represent relationships between the entities (e.g., an aggregated event occurring between two entities). For example, the edge 486 can represent a communication event (e.g., including a timestamp) between an originating computing device (e.g., a server) represented by the node 482 and a destination computing device (e.g., a DMZ server) represented by the node 484, and can be directed from the node 482 to the node 484. When representing computing devices and assets, addresses, and ports with unique nodes in a directed graph, for example, replication of entities may be avoided. When representing relationships between entities as edges in a directed graph, for example, multiple related alerts (e.g., alerts that include similar timestamp data and/or related message data) can be represented by a single edge between two nodes. For example, a particular computing device may attempt a series of port scans on each of a set of other devices. In the present example, the particular computing device (i.e., an origin) and each of the set of other devices (i.e., destinations) can be represented by nodes, and the port scans on each of the set of other devices can be consolidated and represented by a respective edge (e.g., an aggregated event or meta alert) between the particular computing device and each of the other devices.

In some implementations, when aggregating alert data and representing the alert data in a data structure, an edge that represents a relationship between two entities may be annotated with information that indicates a range of values included in a set of alerts that correspond to the edge. For example, if an originating device performs a series of port scans on a destination device over the course of a period of time, a single edge between a node representing the originating device and a node representing the destination device can be annotated with a value indicating a time of a first port scan during the period of time, a value indicating a time of a last port scan during the period of time, and a count of a total number of port scans during the period of time. As another example, if an originating device scans a range of ports on a destination device, a single edge between a node representing the originating device and a node representing the destination device can be appended with values indicating each of the ports scanned.

Figure 5A:
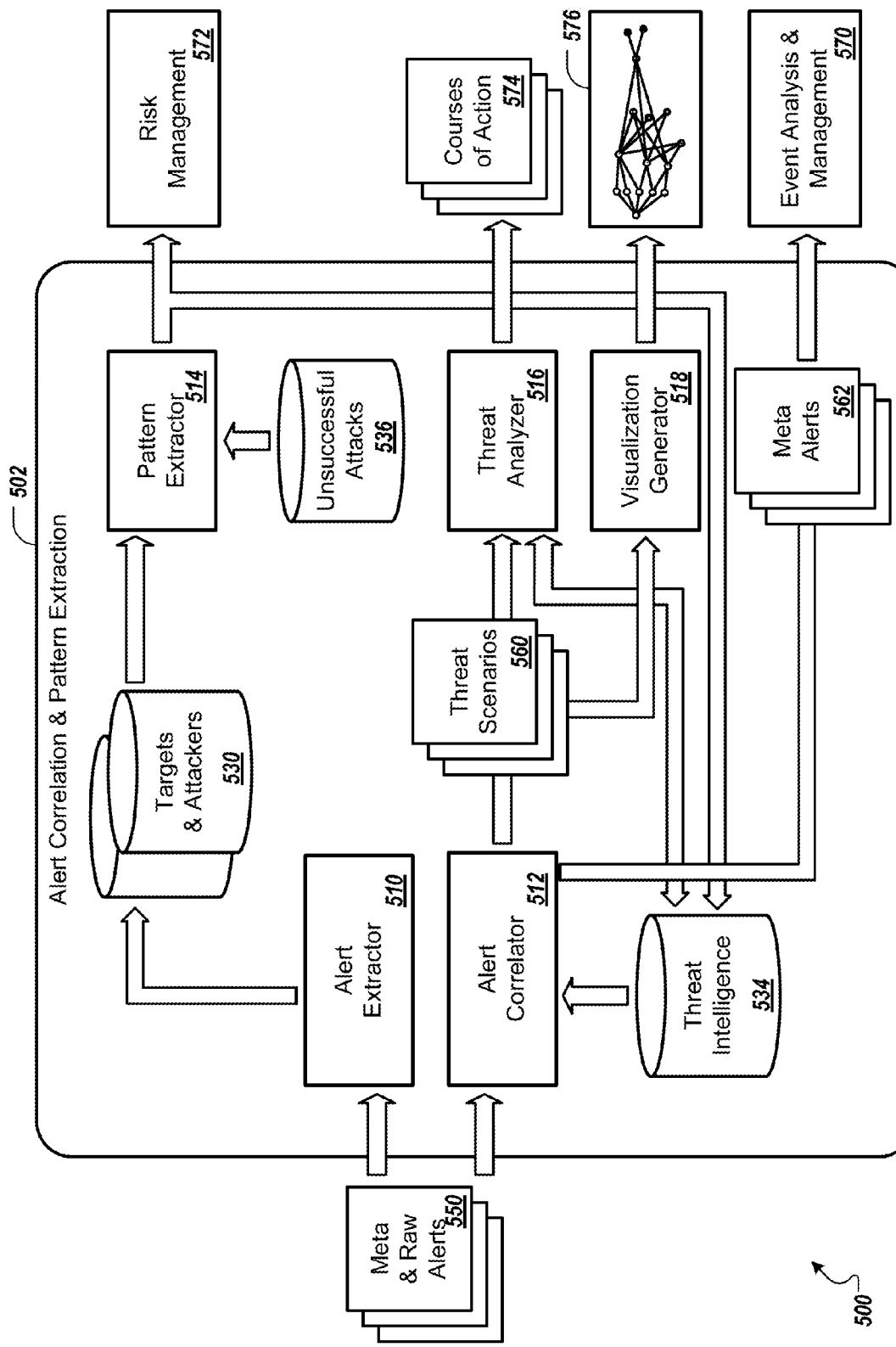
FIG. 5A depicts an example system that can execute implementations of the present disclosure.

FIG. 5A depicts an example system 500 that can execute implementations of the present disclosure. In the present example, the system 500 includes an alert correlation and pattern extraction system 502 (e.g., corresponding to the correlator 216 and the pattern recognizer 218, shown in FIG. 2). The alert correlation and pattern extraction system 502 can include various hardware and/or software-based components (e.g., software modules, objects, engines, libraries, etc.) including an alert extractor 510, an alert correlator 512, a pattern extractor 514, a threat analyzer 516, and a visualization generator 518. Various data sources (e.g., databases, file systems, etc.) may maintain data used by the system 500 and its components. In the present example, the system 500 includes a targets and attackers data source 530, a threat intelligence data source 534 (e.g., similar to the threat intelligence data source 234, shown in FIG. 2), and an unsuccessful attacks data source 536 (e.g., including data provided by the filtered alerts data source 336, shown in FIG. 3). In general, the system 500 and its various components (e.g., components 510, 512, 514, 516, and 518) can perform functions for processing and correlating aggregated event/alert data. By correlating aggregated alert data, for example, complex multi-step attacks against an entire industrial control system network (e.g., including information technology and operational technology network domains) may be detected.

In the present example, the correlation and pattern extraction system 502 can receive meta and raw alerts 550 (e.g., similar to the meta and raw alerts 450, shown in FIG. 4A) from the alert aggregation system 402 (shown in FIG. 4A). The meta and raw alerts 550, for example, may include aggregated and non-aggregated alerts that are associated with suspicious network activity from multiple different network domains (e.g., the industrial technology (IT) network domain 102, the IT DMZ 106a, the operational technology (OT) network domain 104, and the OT DMZ 106b, shown in FIG. 1). In some implementations, the meta and raw alerts 550 may be represented by a data structure (e.g., the data structure 480, shown in FIG. 4B) stored by and retrieved from a graph database (i.e., a database that uses graph structures including nodes, edges, and properties to represent and store data). Upon receiving the meta and raw alerts 550, for example, the correlation and pattern extraction system 502 can provide alert data to the alert extractor 510 and to the alert correlator 512. The alert extractor 510, for example, can analyze the meta and raw alerts 550, can extract information from the meta and raw alerts, and can generate a list of computing devices that are targets of attacks, along with data corresponding to attackers of the targets, such as internet protocol (IP) addresses of the attackers. In some implementations, the alert extractor 510 can traverse the data structure 480 (e.g., a directed graph) and mine the data structure for internet protocol (IP) addresses, uniform resource locator (URL) information, and other relevant data. Data associated with targets and attackers can be provided by the alert extractor 510 to the targets and attackers data source 530, for example. The alert correlator 512, for example, can generate one or more threat scenarios 560 (e.g., chains of events/alerts that indicate attack paths), based on data (e.g., attack signatures and profiles) provided by the threat intelligence data source 534.

In general, correlating alert data may include enriching (e.g., labeling) the alert data, linking related alerts, and identifying an attack path indicated by the linked alerts. For example, the alert correlator 512 can generate threat scenarios 560 by determining chains of alerts included in the meta and raw alerts 550, and optionally prioritizing, labeling, or otherwise enriching alert data, based on data provided by the threat intelligence data source 534. Attack signatures and profiles within the threat intelligence data source 534, for example, may relate to communication patterns between computing devices, and may include information related to potential target devices for a type of attack. As new attacks are detected, for example, information related to attack signatures and profiles may be added to the threat intelligence data source 534.

Enriching alert data, for example, may include analyzing alert data (e.g., the meta and raw alerts 550) and identifying alerts that are associated with a particular attacker. For example, a multi-stage attack performed by an attacker may include reconnaissance, delivery, and installation stages. Each stage, for example, may include communication between the attacker and one or more computing devices on a network during one or more sessions. When enriching the meta and raw alerts 550, for example, the alert correlator 512 can use information provided by the targets and attackers data source 530, the threat intelligence data source 534, and/or additional threat intelligence services to identify alerts that are associated with communications from the particular attacker (e.g., indicated by Internet Protocol (IP) address and country of origin information), and can label or otherwise enrich information related to the alerts as being potentially related to a multi-stage attack.

Linking alert data, for example, may include analyzing previously enriched (e.g., labeled) alerts/events. For example, a subset of the meta and raw alerts 550 may be labeled as being related to an attack performed by a previously identified attacker. The subset of alerts, for example, may correspond to communication with the attacker and with subsequent alerts that may result from the communication (e.g., after the delivery of a malicious payload). In some implementations, a time-based threshold may be used to determine whether two or more alerts are to be linked. For example, the alert correlator 512 may link two or more similarly labeled alerts if the alerts have timestamps within a suitable time threshold value (e.g., one minute, five minutes, ten minutes, or another suitable value). The time threshold value, for example, may be a configurable tuning parameter. In some implementations, linking alert data (i.e., determining a chain of alerts) may depend on a type of attack indicated by an attack signature and/or profile, or another sort of indicator (e.g., an address of an attacker and/or target). For example, a different sub-function may be used by the alert correlator 512 for determining a chain of alerts for each different type of attack, based on attack signatures and profiles defined by the threat intelligence data source 534.

Identifying an attack path indicated by the linked alerts, for example, may include identifying steps that an attacker takes toward an intended target. The alert correlator 512, for example, can analyze previously linked alerts to identify an attack path that may cross one or more network domains. In general, identifying an attack path may include determining a series of communications between computing devices. For example, an attacker may attempt to change the status of a controller device in an operational technology (OT) network, but lack physical access. In the present example, to gain access to the controller device, the attacker may launch an attack against a computer device in an information technology (IT) network, and may exploit the computer device in order to step to a human-machine interface (HMI) device in the operational technology network, and then may further exploit the human-machine interface device in order to step to the controller device. Information associated with identified attack paths can be used by the alert correlator 512, to determine one or more threat scenarios 560.

Figure 5B:
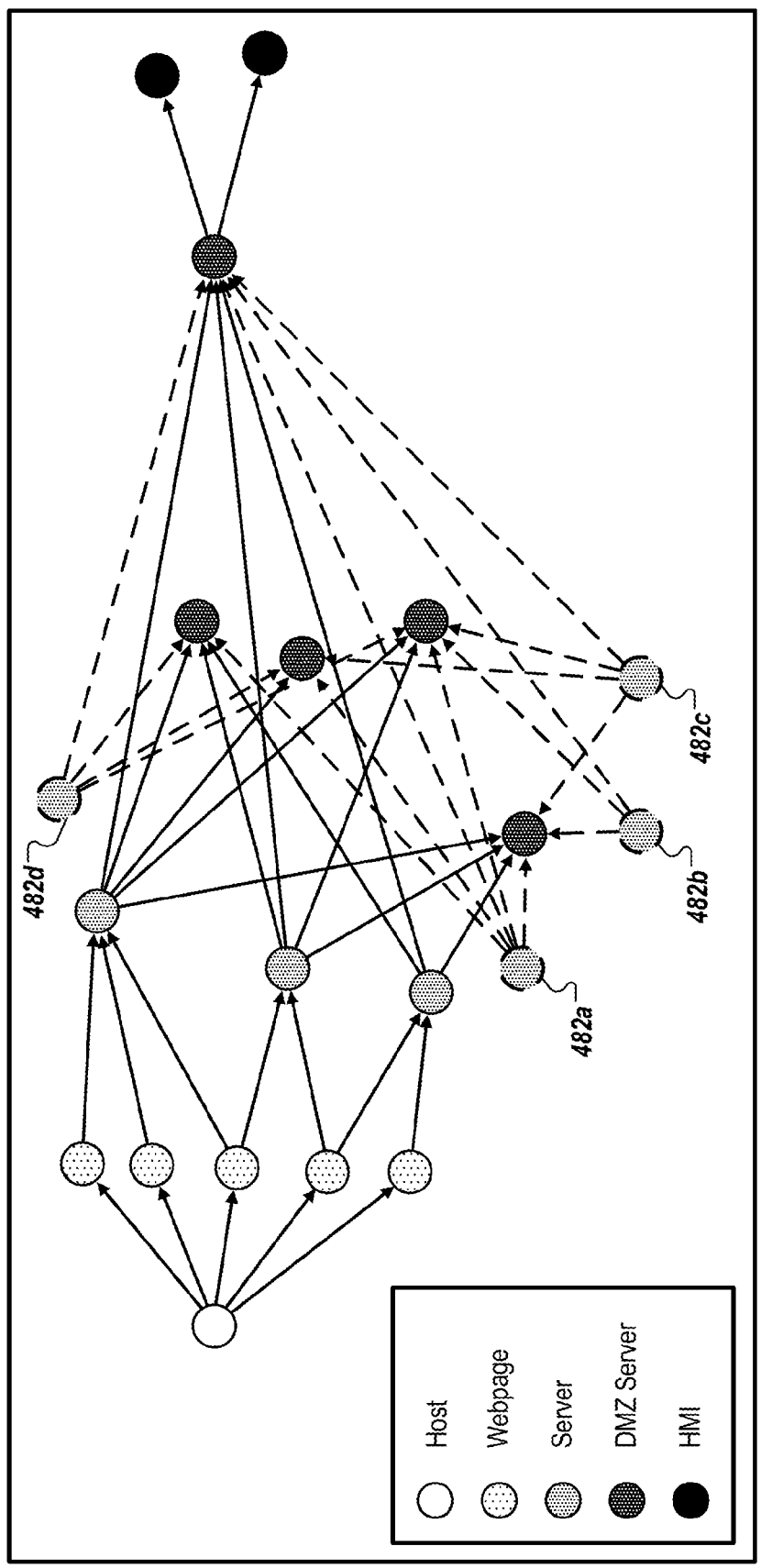
FIGS. 5B, 5C, 5D and 5E depict example data structures that can be used by implementations of the present disclosure.

In some implementations, correlating alert data may include traversing a data structure and determining whether paths included in the data structure are of interest (e.g., represent an attack) or are irrelevant (e.g., represent false positives, noise, etc.). Referring to FIG. 5B, for example, an example data structure 580 (e.g., a directed graph) is shown. The alert correlator 512, for example, can use information provided by the threat intelligence data source 534 and/or other rule or pattern-based sources and/or anomaly detection mechanisms to determine which paths may be of interest, and which paths may be irrelevant. As another example, an anomaly detection mechanism may observe an unusual occurrence of communication between computing devices (e.g., communication between an external host and a programmable logic controller (PLC)), an unusual rate of events between computing devices in a particular timeframe, or another sort of anomaly. Paths including nodes and edges corresponding to one or more anomalous occurrences, for example, may be of interest.

In some implementations, paths that are determined to be irrelevant may be pruned from a data structure. In the present example, nodes 482a, 482b, 482c, and 482d can represent computing devices (e.g., servers) within the information technology (IT) network domain 102, the IT DMZ 106a, the operational technology (OT) network domain 104, or the OT DMZ 106b. The alert correlator 512, for example, may determine that the nodes 482a, 482b, 482c, and 482d are without relationship edges directed to them, and that the nodes do not represent originating devices (i.e., devices that are identified as originating an attack path). Thus, in the present example, the nodes 482a, 482b, 482c, and 482d may be determined as being irrelevant to a path of interest, and the nodes and any edges directed from the nodes that represent relationships to other computing devices represented in the data structure 580 may be pruned by the alert correlator 512. The pruned data structure can then be stored for further processing and/or for display to a system operator.

In some implementations, information related to paths that have previously been identified (e.g., by an operator) as being irrelevant may be used to prune paths from a data structure. For example, a path that had previously been determined by the alert correlator 512 as being a potential path of interest may be identified by an operator as being irrelevant (e.g., a false positive). In the present example, if the alert correlator 512 determines that a particular path includes characteristics of the path that was identified as being irrelevant (e.g., based on information provided by the threat intelligence data source 534), the particular path may be pruned from the data structure 580.

Figure 5C:
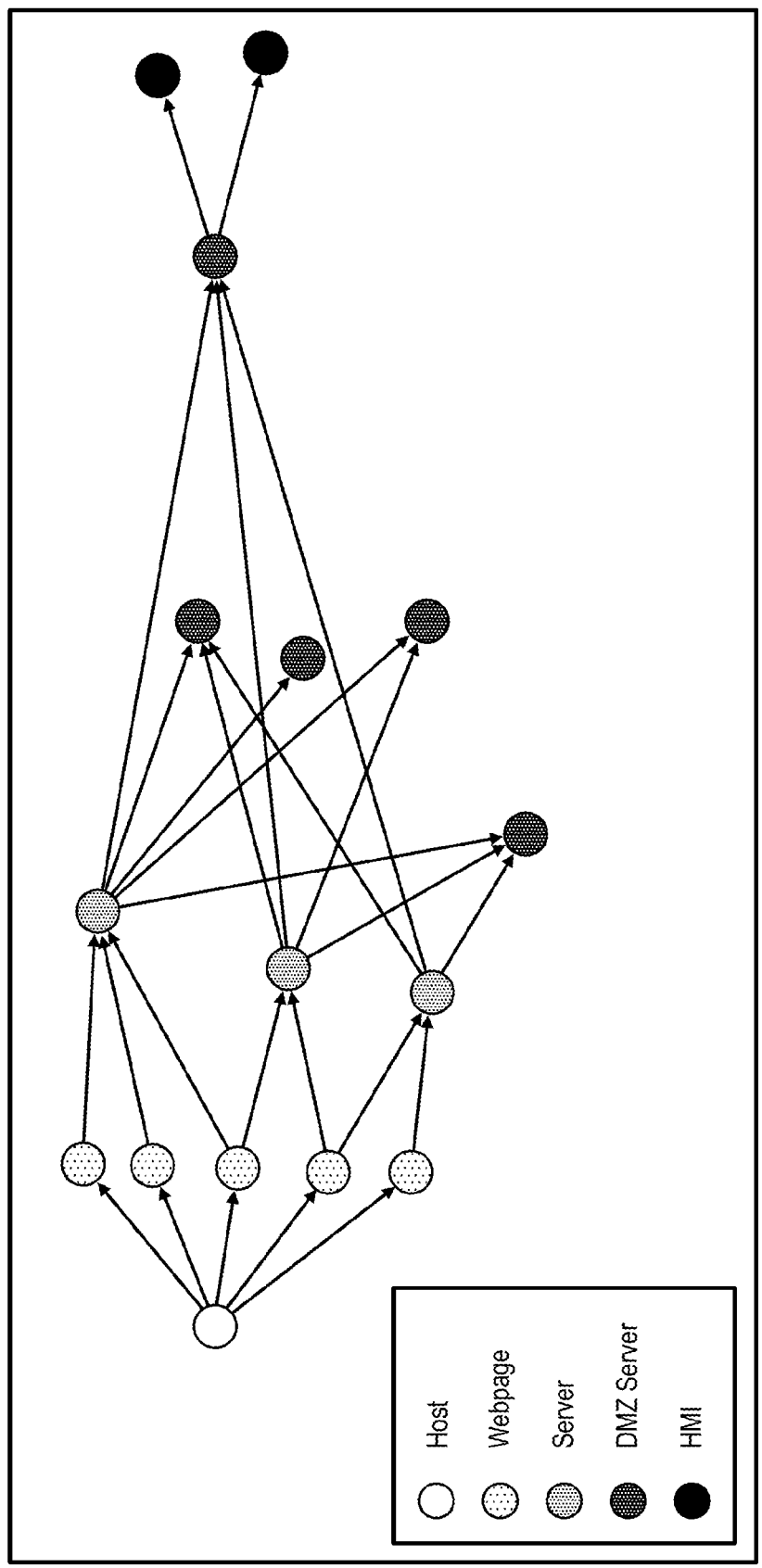

Referring to FIG. 5C, for example, an example data structure 590 (e.g., a pruned version of the example data structure 580) is shown. The alert correlator 512 can use information from the threat intelligence data source 534, for example, to enrich the example data structure 590 to include additional information regarding one or more paths of interest, such as information related to past actions associated with computing devices represented by nodes included in the data structure. For example, if a particular computing device has been reported as being associated with malicious activities, a node representing the computing device may be enriched to include such information.

Figure 5D:
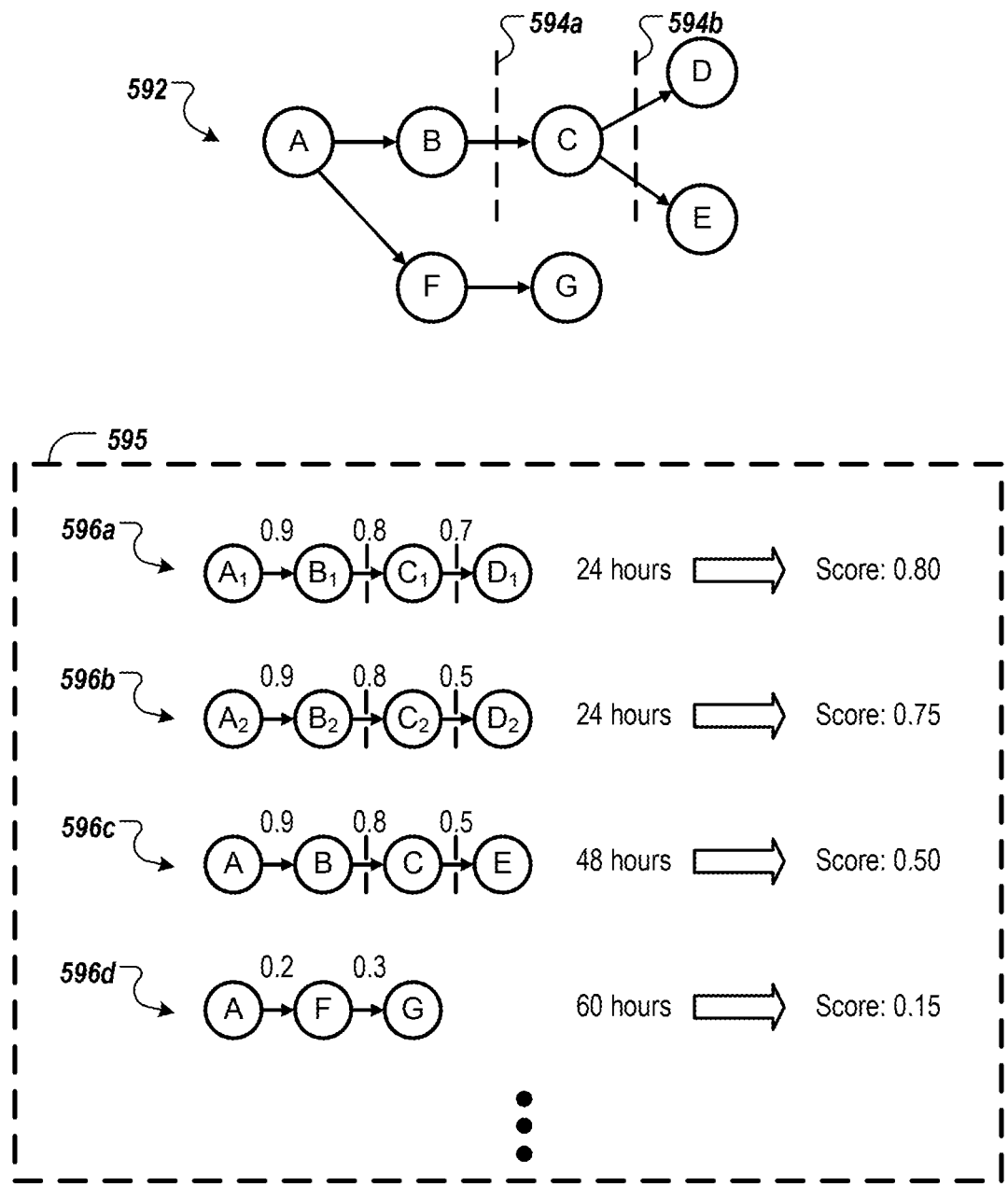

FIG. 5D depicts an example data structure 592 that can be used by implementations of the present disclosure once it is generated and stored by the alert aggregation system 402. In some implementations, the data structure 592 (e.g., a directed graph) can be generated and used to represent the meta and raw alerts 450 provided by the alert aggregation system 402. Nodes (e.g., nodes A, B, C, D, E, F and G) in the data structure 592 can represent entities referenced in the meta and raw alerts 450, such as computing devices/assets (e.g., devices/assets within the information technology (IT)

network domain 102, the IT DMZ 106a, the operational technology (OT) network domain 104, and the OT DMZ 106b), web resources, internet protocol (IP) addresses, and ports. Edges in the data structure 592 can represent relationships between the entities (e.g., an aggregated event occurring between two entities). For example, a directed edge from node A to node B can represent a communication event (e.g., including a timestamp) between an originating computing device represented by node A and a destination computing device represented by node B.

Communication events may occur between nodes of different networks, different domains of a network (e.g., information technology (IT) and operational technology (OT) domains), different architectural layers of a network (e.g., a level including field devices, a level including programmable logic controller (PLC) devices, a level including human-machine interface (HMI) devices, a level including a demilitarized zone (DMZ), and a level including an enterprise network), and different subdomains within a network domain or network layer. In some implementations, communication events may include security events identified by security sensors (e.g., an intrusion detection system). The security events, for example, may be filtered and aggregated by the event correlation system 150 (shown in FIG. 1). As shown by the data structure 592, for example, a communication event between node B and node C (shown as a directed edge from node B to node C) occurs across a boundary 594a (e.g., a boundary between networks, domains, or subdomains). In the present example, a communication event between node C and node D (shown as a directed edge from node C to node D) and a communication event between node C and node E (shown as a directed edge from node C to node E) occurs across a boundary 594b.

As depicted in FIG. 5D, the example data structure 592 may be analyzed to determine a set of potential attack paths 595, to assign a score to each of the potential attack paths, to remove one or more potential attack paths from the set based on its score (i.e., pruning the data structure 592), and to provide information related to the remaining potential attack paths (i.e., paths of interest). The alert correlator 512, for example, can use information provided by the threat intelligence data source 534 and/or other rule or pattern-based sources and/or anomaly detection mechanisms to analyze the data structure 592. In the present example, the set of potential attack paths 595 includes an attack path 596a, an attack path 596b, an attack path 596c, and an attack path 596d. Each of the potential attack paths 596a, 596b, 596c, and 596d, for example, can be determined by traversing the data structure 592 to determine a sequence of nodes from an originating node to a destination node, based on timestamps associated with the directed edges between the nodes. The potential attack path 596a, for example, is a first instance of an attack path originating at node A, proceeding to node B, crossing a first boundary, proceeding to node C, crossing a second boundary, and terminating at node D, whereas the potential attack path 596b is a second instance of the attack path (e.g., a potential attack occurring at a different time). The potential attack path 596c, for example, originates at node A, proceeds to node B, crosses a first boundary, proceeds to node C, crosses a second boundary, and terminates at node E. The potential attack path 596d, for example, originates at node A, proceeds to node F, and terminates at node G (e.g., an attack path that occurs within a network, domain, or subdomain, without crossing a boundary). In some implementations, a set of potential attack paths may include all possible chains of two or more linked nodes within a data structure. For example, a potential attack path may originate at node B and terminate at node C, another potential attack path may originate at node B, proceed to node C, and terminate at node D, and so forth.

In some implementations, assigning a score to each of the potential attack paths may include determining a distance between nodes in a path. For example, spatial examination of each of the potential attack paths 596a, 596b, 596c, and 596d can be accomplished using algorithms such as Min-Max k-Means clustering, and can include determining a spatial distance between nodes included in the path and/or determining a number of logical system boundaries crossed by the path. Logical system boundaries can include, for example, boundaries between network domains, boundaries defined by firewalls, boundaries defined by routers, and other suitable system boundaries. In the present example, each of the nodes A, B, C, D, E, F and G can be associated with a unique identifier (e.g., a device address, an internet protocol (IP) address, a port number, a web address, etc.), and the unique identifier can be used to access location information for the node from a configuration management system (e.g., information stored by the information technology (IT) network data source 330 and/or the operational technology (OT) network data source 332, shown in FIG. 3). The location information, for example, can include information regarding a network, an architectural layer of a network, a network domain and/or subdomain of the node. Based on the location information for two or more nodes and based on a representation of a network topology, for example, a spatial distance between the nodes can be determined. As another example, Internet Protocol (IP) addresses can be used to determine distances between nodes. For example, a node with an address of 54.43.32.1 can be determined as being on a same subnet as a node with an address of 54.43.32.2 (i.e., a small distance between nodes), whereas a node with an address of 97.127.111.1 can be determined as being on a different network as the node with the address of 54.43.32.2 (i.e., a large distance between nodes). As another example, nodes with local addresses (i.e., 10.x.x.x, 127.x.x.x, or 192.x.x.x) can be determined as being distant from nodes having publically assigned Internet Protocol (IP) ranges.

In general, a spatial component score for a potential attack path may be proportional to a distance between nodes included in the path. For example, if an originating node and a destination node included in the path exist at different locations (e.g., different networks, layers, domains, or subdomains) that are determined as being a small distance apart (e.g., within a same domain or subdomain), the path can be assigned a low spatial component score, whereas if the originating node and the destination node included in the path exist at different locations that are determined as being a large distance apart (e.g., within different networks or network layers), the path can be assigned a high spatial component score. As another example, if a potential attack path crosses many network/domain boundaries (e.g., a threshold number or greater), the path can be assigned a high spatial component score, whereas if the path crosses few network/domain boundaries (or no boundaries), the path can be assigned a low spatial component score. In the present example, each of the potential attack paths 596a, 596b, and 596c cross two boundaries, and may be assigned relatively high spatial component scores relative to the potential attack path 596d, which does not cross a boundary. An overall spatial component score that includes spatial component scores for each pair of nodes in a potential attack path may be assigned to the path, for example.

In some implementations, assigning a score to each of the potential attack paths may include determining an amount of time that transpires between communication events in a path. For example, temporal examination of each of the potential attack paths 596a, 596b, 596c, and 596d can be accomplished using topological sorting techniques, and can include determining an overall amount of time between a first communication event and a last communication event included in the path. In the present example, an amount of time associated with each of the potential attack paths 596a and 596b is twenty-four hours, an amount of time associated with the potential attack path 596c is forty-eight hours, and an amount of time associated with the potential attack path 596d is sixty hours. In general, a temporal component score for a potential attack path can be a function of the rate at which communication events associated with the attack path occur. In some implementations, the temporal component score may be inversely proportional to an amount of time associated with the path. The potential attack paths 596a and 596b (e.g., having twenty-four hour durations) may be assigned high temporal component scores relative to the potential attack path 596d (e.g., having a sixty hour duration), for example, whereas the potential attack path 596c (e.g., having a forty-eight hour duration) may be assigned a medium temporal component score. In some implementations, the temporal component score can be based on the rate at which a spatial deviation of nodes along a potential attack path changes. For example, the spatial deviation of nodes along the potential attack path 596a may change more quickly than the spatial deviation of nodes along the potential attack path 596d.

In some implementations, assigning a score to each of the potential attack paths may include determining an importance of nodes in a path and/or communication events in the path. For example, each of the nodes A, B, C, D, E, F and G can be associated with a unique identifier (e.g., a device address), and the unique identifier can be used to access importance information for the node from a configuration management system (e.g., information stored by the information technology (IT) network data source 330 and/or the operational technology (OT) network data source 332, shown in FIG. 3). The importance information, for example, can include a numerical score that indicates the importance of an identified node within a network. As another example, a security sensor (e.g., an intrusion detection system (IDS)) can provide importance information associated with communication events included in a potential attack path. The importance information, for example, can include a numerical score that indicates the importance of (or risk associated with) a communication event. In some implementations, an importance component score for a potential attack path may be a composite score based on an aggregation (e.g., a summing, averaging, or application of another suitable formula) of importance scores for each of the nodes and/or communication events included in the path. For example, the potential attack path 596a may be assigned a high composite importance score based on its importance scores for each of the communication events included in the path (e.g., 0.9, 0.8, and 0.7), relative to the potential attack paths 596b and 596c (e.g., importance scores of 0.9, 0.8, and 0.5), and relative to the potential attack path 596d (e.g., importance scores of 0.2 and 0.3).

In some implementations, assigning a score (e.g., an overall prioritization score) to each of a set of potential attack paths may include aggregating (e.g., summing, averaging, or applying another suitable formula) a spatial component score, a temporal component score, and/or a composite importance score for each path. In the present example, the potential attack path 596a is assigned a score of 0.80, the potential attack path 596b is assigned a score of 0.75, the potential attack path 596c is assigned a score of 0.50, and the potential attack path 506d is assigned a score of 0.15. Based on the assigned overall prioritization score for each of the set of potential attack paths 595, for example, the alert correlator 512 can prune the data structure 592. For example, each of the prioritization scores can be compared to a threshold value (e.g., a configurable value specified by a system operator) and potential attack paths that have been assigned scores that do not meet the threshold can be removed from the set of potential attack paths 595. In the present example, considering a threshold value of 0.30, the potential attack path 596d (e.g., having been assigned a prioritization score of 0.15) can be determined as not having met the threshold value, and can be removed. The remaining potential attack paths (e.g., potential attack paths 596a, 596b, and 596c) can be ranked by the alert correlator 512, for example, based on their respective overall prioritization scores. Highly ranked potential attack paths, for example, may be flagged for presentation and for review as particularly important paths of interest.

Figure 5E:
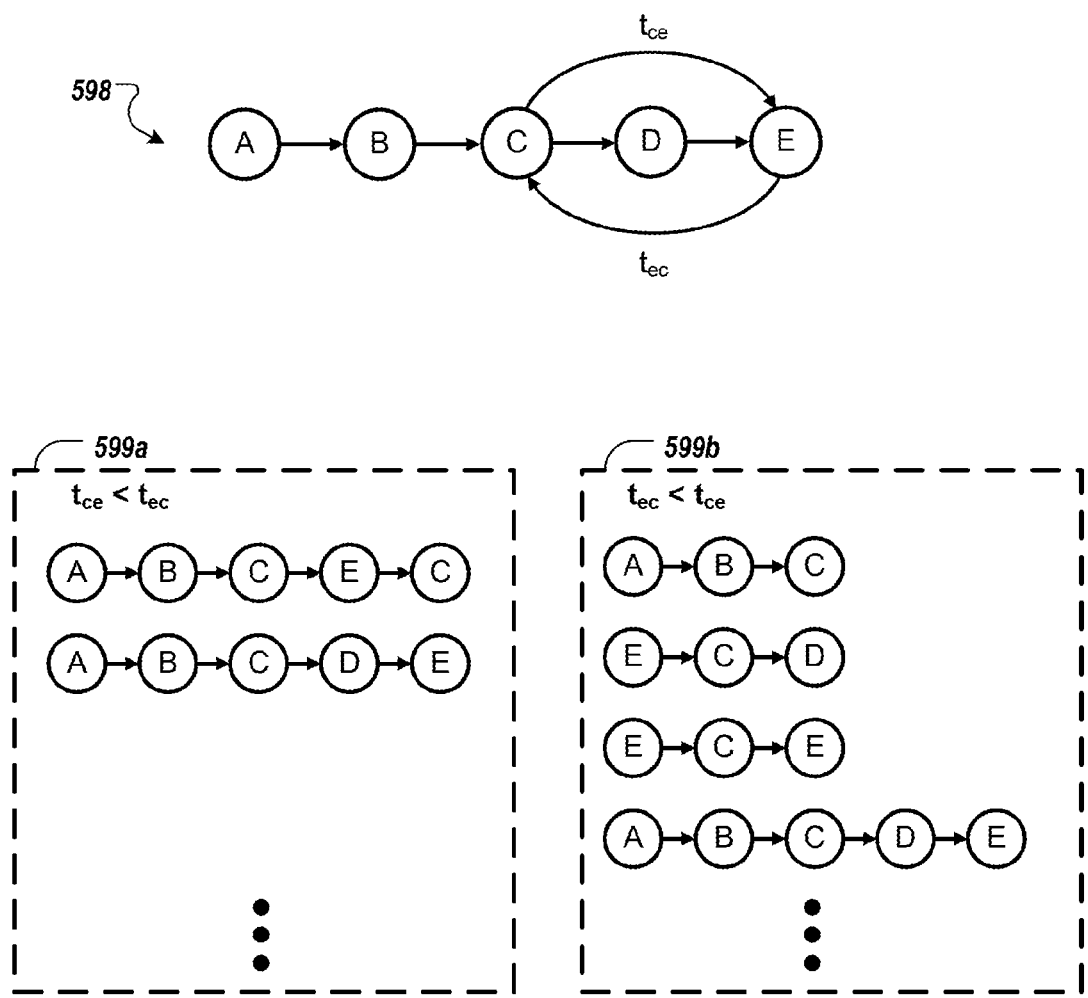

FIG. 5E depicts an example data structure 598 that can be used by implementations of the present disclosure once it is generated and stored by the alert aggregation system 402. In some implementations, the data structure 598 (e.g., a directed graph) can be generated and used to represent the meta and raw alerts 450 provided by the alert aggregation system 402. Nodes (e.g., nodes A, B, C, D and E) in the data structure 598 can represent entities referenced in the meta and raw alerts 450, such as computing devices/assets (e.g., devices/assets within the information technology (IT) network domain 102, the IT DMZ 106a, the operational technology (OT) network domain 104, and the OT DMZ 106b), internet protocol (IP) addresses, and ports. Edges in the data structure 598 can represent relationships between the entities (e.g., an aggregated event occurring between two entities). For example, a directed edge from node A to node B can represent a communication event (e.g., including a timestamp) between an originating computing device represented by node A and a destination computing device represented by node B.

As depicted in FIG. 5E, for example, the data structure 598 may be analyzed (e.g., by the alert correlator 512) to determine a set of potential attack paths. In some implementations, analysis of a data structure may include determining a meshedness coefficient $\alpha=(m-n+1)/(2n-5)$, where m is a number of relationships in the data structure, and n is a number of nodes in the data structure. A meshedness coefficient for a data structure of greater than zero, for example, indicates that the data structure includes one or more loops. In the present example, node E (e.g. a leaf node), is shown as looping back to node C (e.g., an ancestor node). To determine a set of potential attack paths represented by a data structure that includes one or more loops, for example, timestamp data associated with edges that represent communications between nodes can be identified and used to determine non-looped sequences of nodes that each proceed from an originating node to a destination node. For example, if a communication event from node C to node E is identified as occurring before a communication event from node E to node C, a set of potential attack paths 599a can be identified. The set of potential attack paths 599a, for example, includes a first path that originates at node A, proceeds to node B, proceeds to node C, proceeds to node E, and returns to node C, a second path that originates at node A, proceeds to node B, proceeds to node C, proceeds to node D, and terminates at node E, and other paths that may be derived from the data structure 598. As another example, if the communication event from node E to node C is identified as occurring before the communication event from node C to node E, a set of potential attack paths 599b can be identified. The set of potential attack paths 599b, for example, includes a first path that originates at node A, proceeds to node B, and terminates at node C, a second path that originates at node E, proceeds to node C, and terminates at node D, a third path that originates at node E, proceeds to node C, and returns to node E, a fourth path that originates at node A, proceeds to node B, proceeds to node C, proceeds to node D, and terminates at node E, and other paths that may be derived from the data structure 598. After analyzing the data structure 598 to determine a set of potential attack paths, for example, the alert correlator 512 can assign a score to each of the potential attack paths, to remove one or more potential attack paths from the set based on its score (i.e., pruning the data structure 592), and to provide information related to the remaining potential attack paths (i.e., paths of interest).

Referring again to FIG. 5A, the threat scenarios 560 can be provided by the event correlator 512, for example, to the threat analyzer 516 and the visualization generator 518. In some implementations, the threat scenarios 560 may be represented by a pruned data structure. For example, the data structure 590 (e.g., a pruned directed graph, shown in FIG. 5C) may include various paths of interest (i.e., potential attack paths), enriched with additional information. In some implementations, the alert correlator 512 can provide uncorrelated meta-alerts 562 to an event analysis and management system 570 (e.g., a security information and event management (SIEM) system). For example, an uncorrelated meta-alert may eventually be correlated to other alerts (e.g., after additional event/alert data is collected), and the previously uncorrelated meta-alert may be correlated to generate an additional threat scenario. In some implementations, the alert correlator 512 can provide correlated meta-alerts 562 to the event analysis and management system 570. For example, the event analysis and management system 570 may support a format to receive correlated and/or uncorrelated meta-alerts.

The alert correlation and pattern extraction system 502 can use the pattern extractor 514, for example, to detect previously unknown security threats. For example, the pattern extractor 514 can analyze data from the targets and attackers data source 530 and from the unsuccessful attacks data source 536 to identify patterns, signatures, and rules associated with potential security attacks. In some implementations, data related to potential attacks can be provided to one or more components for use in identifying and/or preventing future attacks. In the present example, data from the pattern extractor 514 can be provided to a risk management component 572 and/or to the threat intelligence data source 534. In general, the risk management component 572 may provide information to a user (e.g., a network administrator) to assist in installing new software or software patches within a system, based on identified risks.

The alert correlation and pattern extraction system 502 can use the threat analyzer 516, for example, to analyze the threat scenarios 560, and to generate data associated with one or more courses of action 574. For example, the threat analyzer 516 can determine the impact of attacks on the operation of information technology and operational technology networks (e.g., the information technology network domain 102 and the operational technology network domain 104, shown in FIG. 1), rank threat scenarios 560 based on their importance and on system priorities, and provide courses of action 574 relevant to each threat scenario (e.g., based on information provided by the threat intelligence data source 534). Processed threat scenario data, for example, can be provided by the threat analyzer 516 to the threat intelligence data source 534. In some implementations, appropriate courses of action 574 may be provided for each domain (e.g., information technology and operational technology) and/or each device in an industrial control system network. Courses of action 574, for example, may include actions such as closing ports on computing devices, blocking communications that originate from particular internet protocol addresses, shutting down computing devices, and so forth.

The alert correlation and pattern extraction system 502 can use the visualization generator 518, for example, to generate one or more reports and/or diagrams (e.g., diagram 576). For example, the visualization generator 518 can analyze the threat scenarios 560 and can determine a progression of system states and communication paths during an attack. In general, diagrams generated by the visual generator 518 may include sunburst diagrams, node diagrams, and/or other suitable diagrams, which may illustrate communications patterns between computing devices in a network. In some implementations, a visualization may be generated based on a data structure that represents one or more potential paths of interest (e.g., attack paths). For example, the data structure 590 (e.g., a pruned directed graph, shown in FIG. 5C) can be used by the visualization generator 518 to generate the diagram 576. The diagram 576, for example, can be presented to an operator by the interface device 154 (shown in FIG. 1). Upon reviewing the diagram 576, for example, the operator may identify anomalous network activity and/or may identify one or more irrelevant paths (e.g., false positives, noise, etc.).

Figure 6A:
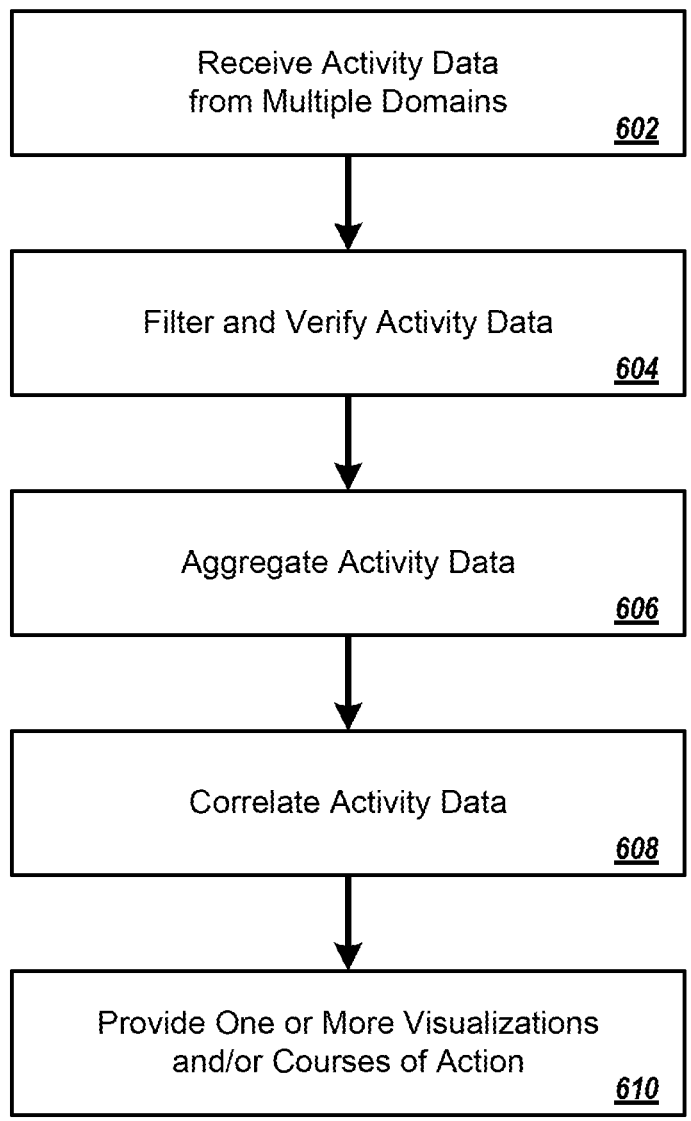
FIGS. 6A and 6B are flowcharts of example processes that can be executed in accordance with implementations of the present disclosure.

FIG. 6A is a flowchart of an example process 600 that can be executed in accordance with implementations of the present disclosure. The process 600, for example, can be performed by systems such as one or more of the example systems described above. Briefly, the example process 600 includes receiving activity data from multiple domains, filtering and verifying the activity data, aggregating the activity data, correlating the activity data, and providing one or more visualizations and courses of action in response to the activity data.

Activity data can be received from multiple domains (602). Referring to FIGS. 1 and 2 and as discussed above, for example, activity data (e.g., event/alert data provided by one or more intrusion detection systems) can be received by an event correlation system. In the present example, activity data can be received from an information technology (IT) and from an operational technology (OT) network.

Activity data can be filtered and verified (604). Referring to FIGS. 2 and 3 and as discussed above, for example, information technology (IT) and operational technology (OT) activity data can be filtered, verified, and further processed. Filtered activity data can be maintained for further use (e.g., by one or more threat intelligence services). Activity data (e.g., raw alerts) indicative of potential attacks can be provided for aggregation.

Activity data can be aggregated (606). Referring to FIGS. 2 and 4 and as discussed above, for example, raw alerts from an information technology (IT) and from an operational technology (OT) network can be fused and aggregated. Fused and aggregated alerts (i.e., meta-alerts) and raw alerts can be provided for correlation.

Activity data can be correlated (608). Referring to FIGS. 2 and 5A and as discussed above, for example, meta-alerts and raw alerts can be correlated, based on threat intelligence (e.g., attack signatures and profiles). Further, the meta-alerts and raw alerts can be extracted to identify data associated with targets and attackers. Based on data associated with the targets and attackers and based on previously filtered activity data, for example, patterns can be extracted and the threat intelligence can be updated.

One or more visualizations and/or courses of action can be provided (610). Referring to FIGS. 2 and 5A and as discussed above, for example, by correlating meta-alerts and raw alerts, one or more threat scenarios may be identified, which can be used for generating visualizations and/or for identifying courses of action. Further, information associated with meta-alerts may be provided to an event analysis and management system.

Figure 6B:
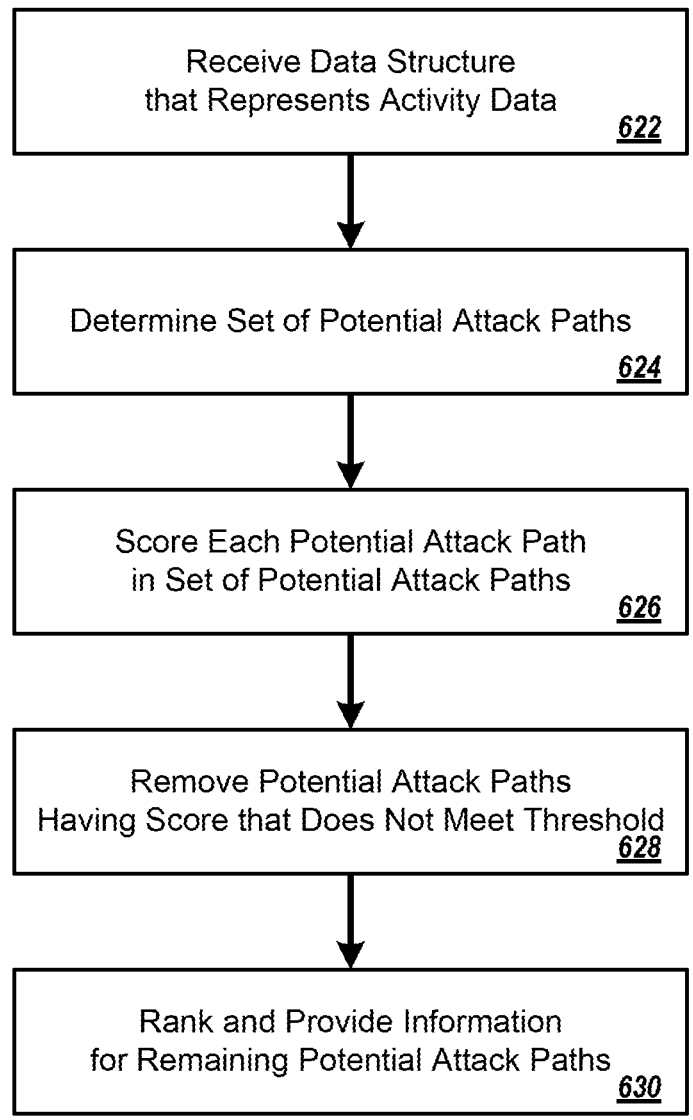

FIG. 6B is a flowchart of an example process 620 that can be executed in accordance with implementations of the present disclosure. The process 620, for example, can be performed by systems such as one or more of the example systems described above (e.g., including the alert correlator 512, shown in FIG. 5A). Briefly, the example process 620 includes receiving a data structure that represents activity data, determining a set of potential attack paths represented in the data structure, scoring each of the potential attack paths, removing potential attack paths having a score that does not meet a threshold, and ranking and providing information for the remaining potential attack paths.

A data structure that represents activity data can be received (622). Referring to FIG. 5A and as discussed above, for example, meta and raw alerts 550 may be represented by a data structure (e.g., a directed graph). Upon receiving the meta and raw alerts 550, for example, the correlation and pattern extraction system 502 can provide the data to the alert correlator 512 for analysis.

A set of potential attack paths can be determined (624). Referring to FIG. 5D and discussed above, for example, the alert correlator 512 can determine the set of potential attack paths 595 represented in the data structure 592. The alert correlator 512, for example, can use information provided by the threat intelligence data source 534 and/or other rule or pattern-based sources and/or anomaly detection mechanisms to analyze the data structure 592. The potential attack paths 596a, 596b, 596c, and 596d, for example, can be determined by traversing the data structure 592 to determine a sequence of nodes from an originating node to a destination node, based on timestamps associated with the directed edges between the nodes.

Each potential attack path in a set of potential attack paths can be scored (626). Referring to FIG. 5D and discussed above, for example, the alert correlator 512 can score each of the potential attack paths 596a, 596b, 596c, and 596d. Assigning an overall prioritization score to each of the potential attack paths, for example, can include assigning one or more component scores, including a spatial component score, a temporal component score, and/or an importance component score.

Potential attack paths having a score that does not meet a threshold can be removed (628). Referring to FIG. 5D and discussed above, for example, a configurable threshold value may be specified by a system operator. Each of the overall prioritization scores for each of the potential attack paths 596a, 596b, 596c, and 596d, for example, can be compared to the threshold value, and potential attack paths that have scores that do not meet the threshold value can be removed (i.e., pruned) from the set of potential attack paths 595.

Information for remaining potential attack paths can be ranked and provided (630). Referring to FIG. 5D and discussed above, for example, potential attack paths that remain in the set of potential attack paths 595 can be ranked, based on their corresponding overall prioritization scores. Referring to FIGS. 2 and 5A and discussed above, for example, the ranked set of remaining attack paths 595 can be provided by the alert correlator 512 as threat scenarios 560 (e.g., chains of events/alerts that likely indicate attack paths). By prioritizing chains of events/alerts that are more likely to indicate attack paths, for example, an overall amount of data to be communicated and maintained by the event correlation system 202 can be reduced, without losing insight that may be provided by the data.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
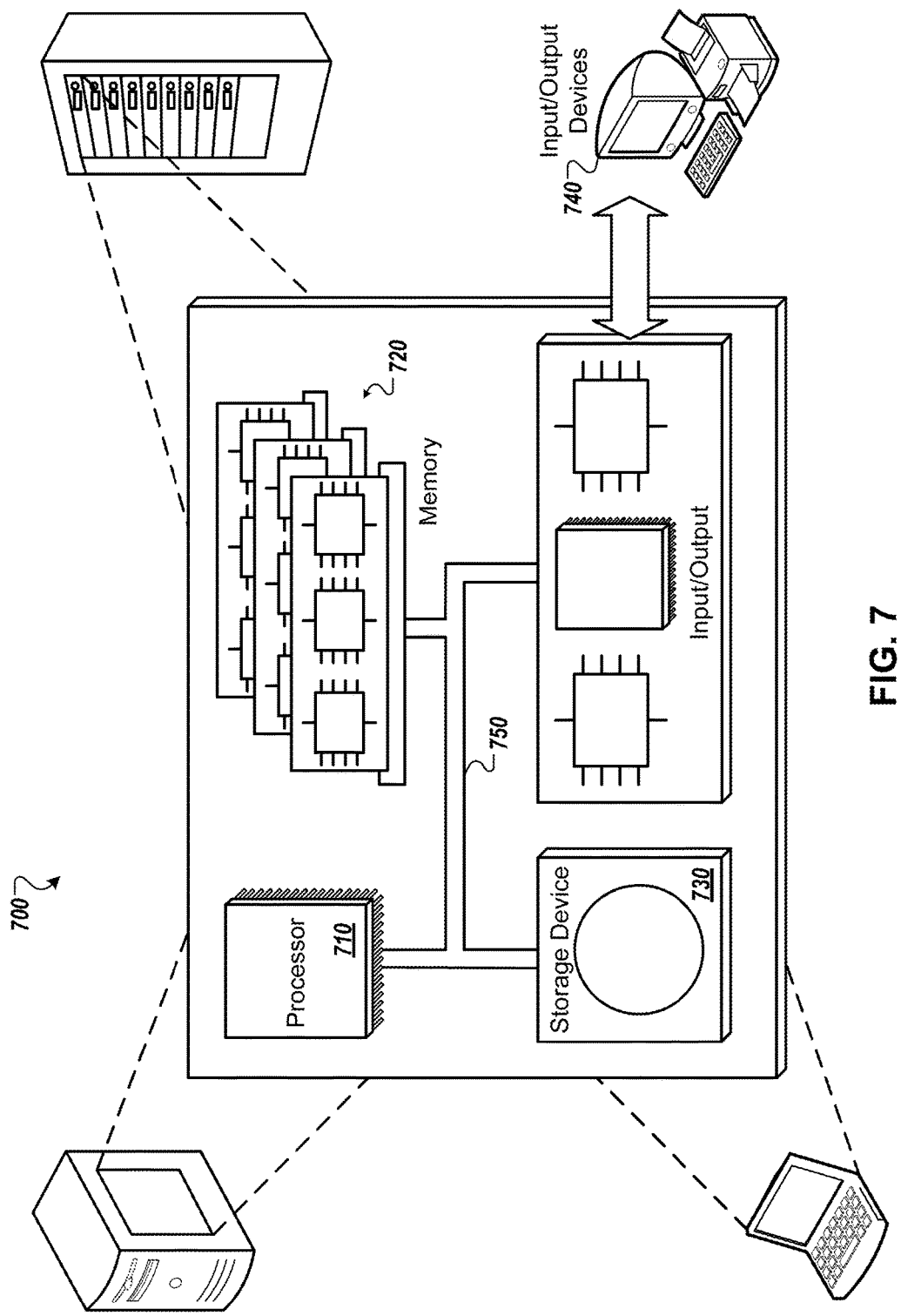
FIG. 7 is a block diagram of a computing system that can be used in connection with computer-implemented methods described in this document.

An example of one such type of computer is shown in FIG. 7, which shows a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for determining a network security threat response, the method being executed by one or more processors and comprising:
   receiving a data structure that represents communication events between computing devices of two or more network domains, including at least an originating computing device and a destination computing device, wherein the originating computing device and the destination computing device exist on different network domains;
   analyzing the data structure and determining a plurality of threat scenarios, each threat scenario being based on a respective chain of communication events that is represented in the data structure and that indicates a potential attack, the chain of communication events including a sequence of communication events between the computing devices of the two or more network domains proceeding from the originating computing device to the destination computing device;
   receiving, for the plurality of threat scenarios and from a threat intelligence data source, prior attack pattern data that is associated with prior computing device communications that occurred during one or more prior attacks; and
   based on the prior attack pattern data, for at least one of the plurality of threat scenarios:
      determining one or more courses of action for responding to the threat scenario; and
      providing information associated with the one or more courses of action for responding to the threat scenario, the information being relevant to at least one of the computing devices of the two or more network domains.

2. The method of claim 1, wherein the data structure is a directed graph maintained by a graph database.

3. The method of claim 1, wherein the prior attack pattern data includes attack signatures and profiles associated with the one or more prior attacks.

4. The method of claim 1, further comprising:
   detecting that the potential attack is an actual attack that has occurred on a network that includes the two or more network domains;
   determining observed attack pattern data that is associated with communications between the computing devices of the two or more network domains that occurred during the actual attack; and
   providing the observed attack pattern data to the threat intelligence data source.

5. The method of claim 4, wherein the actual attack is a successful attack.

6. The method of claim 4, wherein the actual attack is an unsuccessful attack.

7. The method of claim 1, further comprising:
   determining, for each of the plurality of threat scenarios, an impact of the potential attack on operation of the two or more network domains; and
   ranking the plurality of threat scenarios based on system priorities, and providing information associated with the ranked plurality of threat scenarios.

8. The method of claim 1, further comprising providing, for the at least one of the plurality of threat scenarios and for each of the two or more network domains, information associated with the one or more courses of action for responding to the threat scenario, the information being relevant to at least one of the computing devices of the respective network domain.

9. The method of claim 1, further comprising determining a potential target device of the potential attack, wherein providing information associated with the one or more courses of action for responding to the threat scenario includes providing instructions for installing or updating one or more software applications on the potential target device.

10. The method of claim 1, further comprising determining a potential source device of the potential attack, wherein providing information associated with the one or more courses of action for responding to the threat scenario includes providing instructions for blocking communications that originate from the potential source device.

11. A system, comprising:
   one or more processors; and
   a computer-readable storage device coupled to the one or more processors and having instructions stored thereon which, when executed by the one or more processors, cause the one or more processors to perform operations for determining a network security threat response, the operations comprising:
      receiving a data structure that represents communication events between computing devices of two or more network domains, including at least an originating computing device and a destination computing device, wherein the originating computing device and the destination computing device exist on different network domains;
      analyzing the data structure and determining a plurality of threat scenarios, each threat scenario being based on a respective chain of communication events that is represented in the data structure and that indicates a potential attack, the chain of communication events including a sequence of communication events between the computing devices of the two or more network domains proceeding from the originating computing device to the destination computing device;
      receiving, for the plurality of threat scenarios and from a threat intelligence data source, prior attack pattern data that is associated with prior computing device communications that occurred during one or more prior attacks; and
      based on the prior attack pattern data, for each of the plurality of threat scenarios:
         determining one or more courses of action for responding to the threat scenario;

determining an impact of the potential attack on operation of the two or more network domains;

ranking the threat scenario among the plurality of threat scenarios based on system priorities; and providing information associated with the one or more courses of action for responding to the threat scenario, the information being relevant to at least one of the computing devices of the two or more network domains.

12. The system of claim 11, further comprising providing, for each of the plurality of threat scenarios and for each of the two or more network domains, information associated with the one or more courses of action for responding to the threat scenario, the information being relevant to at least one of the computing devices of the respective network domain.

13. The system of claim 11, further comprising determining a potential target device of the potential attack, wherein providing information associated with the one or more courses of action for responding to the threat scenario includes providing instructions for installing or updating one or more software applications on the potential target device.

14. The system of claim 11, further comprising:
detecting that the potential attack is an attack that has occurred on a network that includes the two or more network domains;
determining observed attack pattern data that is associated with communications between the computing devices of the two or more network domains that occurred during the actual attack; and
providing the observed attack pattern data to the threat intelligence data source.

15. The system of claim 14, wherein the actual attack is a successful attack.

16. The system of claim 14, wherein the actual attack is an unsuccessful attack.

17. The system of claim 11, wherein the data structure is a directed graph maintained by a graph database.

18. The system of claim 11, wherein the prior attack pattern data includes attack signatures and profiles associated with the one or more prior attacks.

19. A non-transitory computer-readable storage medium coupled to one or more processors and having instructions stored thereon which, when executed by the one or more processors, cause the one or more processors to perform operations for determining a network security threat response, the operations comprising:
receiving a data structure that represents communication events between computing devices of two or more network domains, including at least an originating computing device and a destination computing device, wherein the originating computing device and the destination computing device exist on different network domains;
analyzing the data structure and determining a plurality of threat scenarios, each threat scenario being based on a respective chain of communication events that is represented in the data structure and that indicates a potential attack, the chain of communication events including a sequence of communication events between the computing devices of the two or more network domains proceeding from the originating computing device to the destination computing device;
receiving, for the plurality of threat scenarios and from a threat intelligence data source, prior attack pattern data that is associated with prior computing device communications that occurred during one or more prior attacks; and
based on the prior attack pattern data, for at least one of the plurality of threat scenarios:
determining one or more courses of action for responding to the threat scenario; and
providing information associated with the one or more courses of action for responding to the threat scenario, the information being relevant to at least one of the computing devices of the two or more network domains.

20. The computer-readable storage medium of claim 19, further comprising:
determining, for the at least one of the plurality of threat scenarios, an impact of the potential attack on operation of the two or more network domains.

21. The computer-readable storage medium of claim 19, further comprising providing, for the at least one of the plurality of threat scenarios and for each of the two or more network domains, information associated with the one or more courses of action for responding to the threat scenario, the information being relevant to at least one of the computing devices of the respective network domain.

22. The computer-readable storage medium of claim 19, further comprising determining a potential target device of the potential attack, wherein providing information associated with the one or more courses of action for responding to the threat scenario includes providing instructions for installing or updating one or more software applications on the potential target device.

* * * * *